(12) United States Patent
Yamada et al.

(10) Patent No.: US 12,315,011 B2
(45) Date of Patent: May 27, 2025

(54) SERVER

(71) Applicant: NOMURA RESEARCH INSTITUTE, LTD., Tokyo (JP)

(72) Inventors: Hiroyuki Yamada, Tokyo (JP); Akira Arai, Tokyo (JP); Taro Morioka, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 0 days.

(21) Appl. No.: 17/909,827

(22) PCT Filed: Jun. 29, 2021

(86) PCT No.: PCT/JP2021/024545
§ 371 (c)(1),
(2) Date: Sep. 7, 2022

(87) PCT Pub. No.: WO2022/004716
PCT Pub. Date: Jan. 6, 2022

(65) Prior Publication Data
US 2024/0135454 A1 Apr. 25, 2024
US 2024/0233024 A9 Jul. 11, 2024

(30) Foreign Application Priority Data
Jun. 30, 2020 (JP) .................................. 2020-112774

(51) Int. Cl.
G06Q 40/00 (2023.01)
G06Q 40/04 (2012.01)
G06Q 40/06 (2012.01)

(52) U.S. Cl.
CPC ............. *G06Q 40/06* (2013.01); *G06Q 40/04* (2013.01)

(58) Field of Classification Search
None
See application file for complete search history.

(56) References Cited

U.S. PATENT DOCUMENTS

2013/0059648 A1* 3/2013 Rowe .................. G07F 17/3248
463/25
2019/0057447 A1* 2/2019 Doo ....................... G06Q 40/04

FOREIGN PATENT DOCUMENTS

JP 2009-217312 A 9/2009
JP 2018-92475 A 6/2018
(Continued)

OTHER PUBLICATIONS

International Search Report (ISR) dated Sep. 21, 2021 filed in PCT/JP2021/024545.
(Continued)

*Primary Examiner* — Olabode Akintola
(74) *Attorney, Agent, or Firm* — RANKIN, HILL & CLARK LLP

(57) ABSTRACT

A server includes means for receiving a request for conversion from a first electronic value into a second electronic value from a user's terminal via a network, means for receiving an investment instruction to invest in the second electronic value obtained by the conversion from the user's terminal via the network, holding means for holding information regarding a type of merchandise corresponding to the second electronic value and a range of the second electronic value in association with each other, means for receiving a redemption instruction to redeem the second electronic value for the merchandise from the user's terminal via the network, the second electronic value being increased or decreased by the investment, and means for referring to the holding means and performing merchandise redemption processing on a basis of the received redemption instruction.

6 Claims, 26 Drawing Sheets

(56) References Cited

FOREIGN PATENT DOCUMENTS

| | | |
|---|---|---|
| JP | 2018-180853 A | 11/2018 |
| JP | 2019-160196 A | 9/2019 |

OTHER PUBLICATIONS

Written Opinion of the International Searching Authority dated Sep. 21, 2021 filed in PCT/JP2021/024545.

* cited by examiner

FIG. 4

| USER ID | PASSWORD | EARNED POINTS | NUMBER OF INVESTMENT POINTS | INVESTMENT TARGET | ACTUAL EXECUTION RATE | POSITION | AMOUNT OF MONETARY CURRENCY POSSESSED | RATIO | SPECIFIED PROFIT AMOUNT | SPECIFIED LOSS AMOUNT | LIMIT | STOP |
|---|---|---|---|---|---|---|---|---|---|---|---|---|
| A0001 | xyzxy8 | 25000 | 1500 | (REMAINED UNINVESTED) | | | | | | | | |
| | | | 10000 | USD | 100.00pt /USD | LONG | 100 | x1 | 500pt | 300pt | 105.00pt /USD | 97.00pt /USD |

| MERCHANDISE ID | MERCHANDISE NAME | RANGE OF INVESTMENT POINTS |
|---|---|---|
| K01 | AMUSEMENT PARK FREE ADMISSION FOR TWO PERSONS | 10000 TO 11999 |
| K02 | ONE NIGHT AND TWO DAYS INCLUDING CRAB IN ABUNDANCE | 12000 TO 13999 |
| K03 | ONE WEEK TRIP TO PARIS | 14000 TO 15999 |
|  |  |  |

|  | MARKET ORDER | TAKE-PROFIT | STOP-LOSS |
|---|---|---|---|
| NEW ORDER | SLIPPAGE IS PRESENT | N/A | N/A |
| SETTLEMENT | SLIPPAGE IS ABSENT | SLIPPAGE IS ABSENT | SLIPPAGE IS ABSENT |

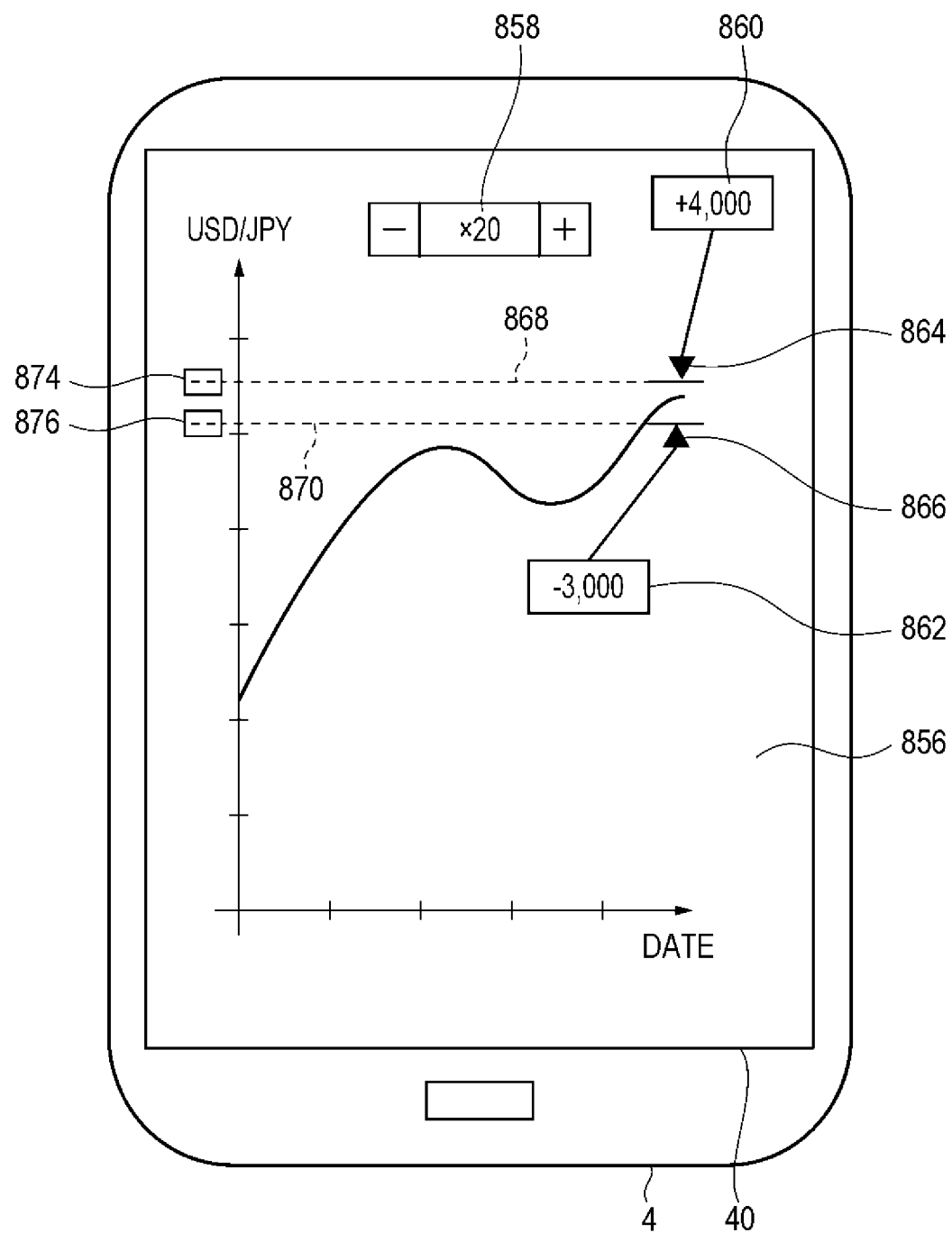

SERVER

TECHNICAL FIELD

The present invention relates to a server that administrates investment in electronic value.

BACKGROUND ART

Investing activities such as stock trading, foreign exchange margin trading, futures trading, bond trading, and the like are made over a long period of history. Services allowing investment in electronic value, such as reward points, directing target people resistant to investing in cash but interested in the investment itself, are being developed nowadays (see, e.g., Patent Literature 1).

Patent Literature 1 discloses the small loan promotion support system that uses customer points for microfinancing. This system receives a user-specified number of points pending for use among the number of points available to the user from a user terminal. The specified number of points pending for use is written in storage means. The point expiry period corresponding to the specified number of pending points is extended on the basis of the reserved period of the specified number of pending points. The information processing is performed that is necessary for the investment volume to be invested as a small loan, which is determined on the basis of the number of pending points stored in the storage means, to be invested in an investment target.

CITATION LIST

Patent Literature

Patent Literature 1: JP 2009-217312 A

SUMMARY OF INVENTION

Technical Problem

The concept of a limit and a stop in investment is well known. In particular, setting a limit and a stop together upon placing an order allows automatic settlement for the order if the condition for the limit or stop is met without checking every day.

Investment experts can set the limit and stop depending on the strategy, but beginners in investment understand the concept of the limit and stop but are often likely not to know the exact setting value of them, which is one of the factors that raise the bar for investment.

The present invention is conceived in view of the issues mentioned above and is intended to provide technology that supports users to set the limit and stop, thus lowering the bar for investment.

Solution to Problem

One aspect of the present invention relates to a server. This server includes means for receiving a request for conversion from a first electronic value into a second electronic value from a user's terminal via a network, means for receiving an investment instruction to invest in the second electronic value obtained by the conversion from the user's terminal via the network, holding means for holding information regarding a type of merchandise corresponding to the second electronic value and a range of the second electronic value in association with each other, means for receiving a redemption instruction to redeem the second electronic value for the merchandise from the user's terminal via the network, the second electronic value being increased or decreased by the investment, and means for referring to the holding means and performing merchandise redemption processing on a basis of the received redemption instruction.

Moreover, an aspect of the present invention also includes any combination of the above-described components as well as those in which the components and expressions of the present invention are replaced among an apparatus, a process, a system, a computer program, a recording medium having a computer program stored, and the like.

Advantageous Effects of Invention

According to the present invention, it is possible to support setting values of a limit and a stop by a user, thereby lowering the bar for investment.

Other features and advantages of the invention will become apparent from the following description with reference to the accompanying drawings. Moreover, in the accompanying drawings, the same or similar configurations are denoted by the same reference numerals.

BRIEF DESCRIPTION OF DRAWINGS

The accompanying drawings are included in the specification, constitute a part thereof, illustrate embodiments of the present invention, and are used together with the description to explain the principle of the present invention.

FIG. 4 is a diagram illustrating a data structure representing an example of a user information holding unit in FIG. 3.

FIG. 6 is a diagram illustrating a data structure representing an example of a merchandise information holding unit in FIG. 3.

FIG. 17 is a diagram illustrating a table sorting and listing the presence or absence of slippage in an embodiment.

FIG. 26 is a diagram illustrating a typical graphical new order receipt screen with a ratio being changed.

DESCRIPTION OF EMBODIMENTS

Figure 1:
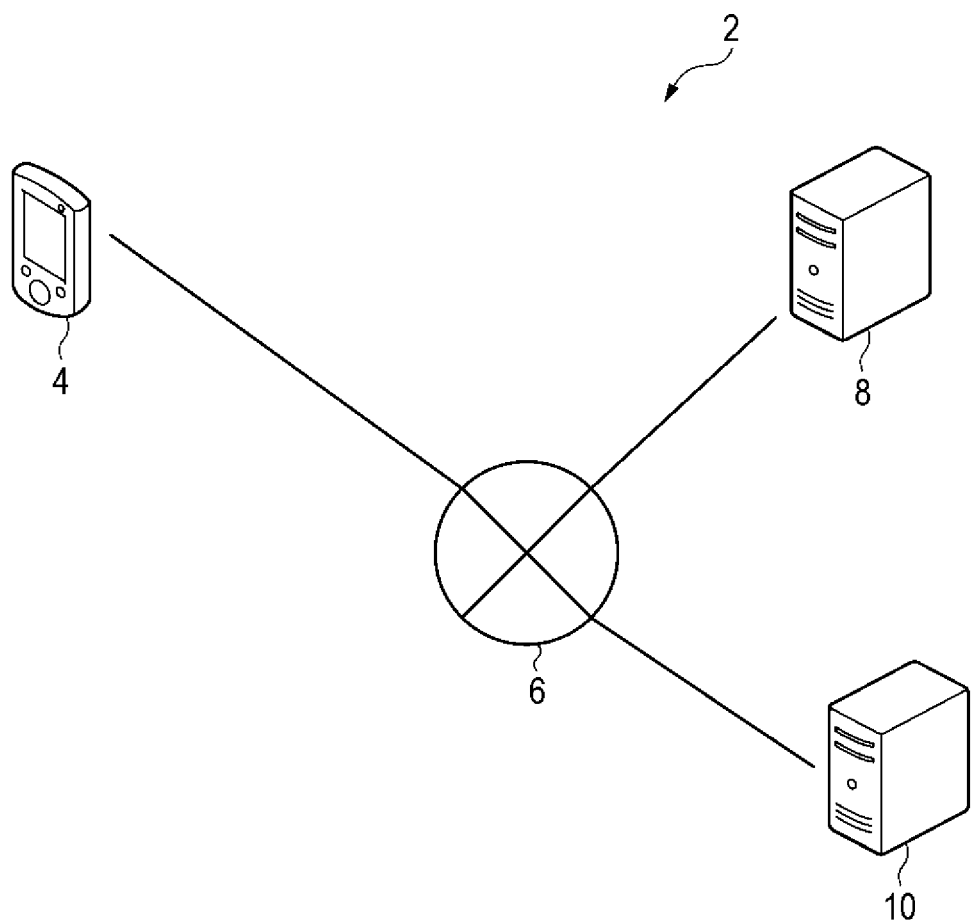
FIG. 1 is a schematic diagram illustrating the configuration of a point investment system according to an embodiment.

Hereinafter, the same or equivalent components, members, and processing shown in the drawings will be denoted by the same reference numerals, and repeated description will be omitted as appropriate. In addition, some of the members that are unimportant for the description are omitted in the drawings.

According to an embodiment, a point investment system converts earned points acquired in various situations into investment points used for investment and manages the obtained points in investment such as foreign exchange, or foreign exchange margin trading (FX). In particular, investment points are allowed to be redeemed for merchandise with values varying in intermittent and stepwise. In one example, investment points in the range of 10000 to 11999 points (herein referred to as simply "pt") have the "same value" in that they can be redeemed for an identical merchandise item A. Investment points in the range of 12000 to 13999 pt also have the "same value" in that they can be redeemed for another merchandise item B that looks better. This arrangement allows a user only to need to set a take-profit target at the bottom of the hierarchy to which the desired merchandise item belongs. In addition, the user only needs to set a stop-loss target at the bottom of the hierarchy to which a merchandise item that the user wants to secure at least belongs. In the example of the merchandise items A and B described above, given that the user wants to secure the merchandise item A at least and aim for the merchandise item B through points operating. In this case, the user is able to recognize with ease that the desired will be achieved by setting the take-profit target to 12000 pt and the stop-loss target to 10000 pt. As described above, the point investment system according to the present embodiment makes it easier for the user to make an investment decision, lowering the bar for investment.

FIG. 1 is a schematic diagram illustrating the configuration of a point investment system 2 according to an embodiment. The point investment system 2 includes a portable terminal 4, an information delivery server 8, and an investment server 10. The portable terminal 4, the information delivery server 8, and the investment server 10 are each connected to a network 6, such as the Internet. They are configured to be able to communicate with each other via the network 6. The configuration illustrated in FIG. 1 is merely illustrative, and the portable terminals 4 or the servers 8 and 10 are unrestricted in the number provided. The servers 8 and 10 can each include a plurality of servers. In one example, the investment server 10 and the information delivery server 8 can be configured as a single server, or the investment server 10 can have functional block components described later, each of which can be configured as a server.

The investment server 10 administrates earned points and investment points of a user who uses point investment services provided by the point investment system 2. The earned points are points acquired by the user through the point investment service, other like loyalty programs, points services, and mileage programs. The earned points can be redeemed for merchandise (e.g., goods or services) at a predetermined rate determined by the issuer that offers points. The investment points are points that can be invested in virtual investment objects (such as shares, investment trusts, futures, or FX) provided by the point investment service. The investment points can be redeemed for merchandise with values varying stepwise depending on the decision by the point issuer, that is, the provider of the point investment service.

The investment in a virtual investment target is herein referred to as virtual investment or investment in virtual or intangible assets. The virtual investment is an investment scheme that provides an experience as if trading financial instruments through data processing without actual buying, selling, trading, or rights transferring of rights for financial instruments. The virtual investment does not involve buying, selling, or the like of actual financial instruments, so its implementation is relatively easy.

The earned points differ from the investment points. In one example, the entity that issues the earned points can differ from the entity that issues the investment points. In the example described above, the entities that issue the investment points are providers of the point investment service, while the earned points can be issued by entities, such as providers of the loyalty programs, other than the point investment service providers. In addition, the mode of redeeming the earned points for merchandise differs from that of redeeming the investment points for merchandise. In one example, the redemption mode can be set so that the earned points are available at an actual store, while the investment points are available only in redemption for merchandise. The range of merchandise that can be redeemed for the earned points can be wider than that of merchandise that can be redeemed for the investment points and vice versa. The redemption rate of the earned points for merchandise can be more advantageous to the user than the redemption rate of the investment points for merchandise and vice versa. The redemption rate from earned points to investment points and the redemption rate from investment points to earned points can be the same or different. In the case of promoting conversion to investment points, the redemption rate from earned points to investment points can be set more favorable than the redemption rate from investment points to earned points. Alternatively, in the case of keeping the point expiration date, the earned points and investment points are redeemable, and in the case of extending the expiration date, the conversion can be irreversible. Alternatively, in the case of narrowing down the selection of merchandise, the conversion from earned points to investment points can be irreversible. Alternatively, converting earned points to investment points can simply be irreversible.

The information delivery server 8 delivers information necessary for processing the virtual investment in the investment server 10 via the network 6 to the investment server 10. The information delivered by the information delivery server 8 includes Japan's Nikkei Stock Average or stock prices of a particular company if the virtual investment target is a stock, and includes the exchange rate if the virtual investment target is FX. The information delivery server 8 can be a server installed in a stock exchange. The description below is given a case where the virtual investment target is FX, but it is obvious to those skilled in the art who have read this specification that the same description holds true for other investment targets as well.

The portable terminal 4 is the mobile data terminal of a user who uses the point investment service and can be, for example, smartphones, tablet terminals, laptop PCs, or the like. The user downloads and installs a point investment application program (herein referred to as a point investment application) from a website for downloading via the network 6 into the portable terminal 4. Alternatively, the point investment application can be pre-installed on the portable terminal 4. The point investment application is offered by a point investment service provider. Running the point investment application in the portable terminal 4 causes the portable terminal 4 to implement its various functions.

Figure 2:
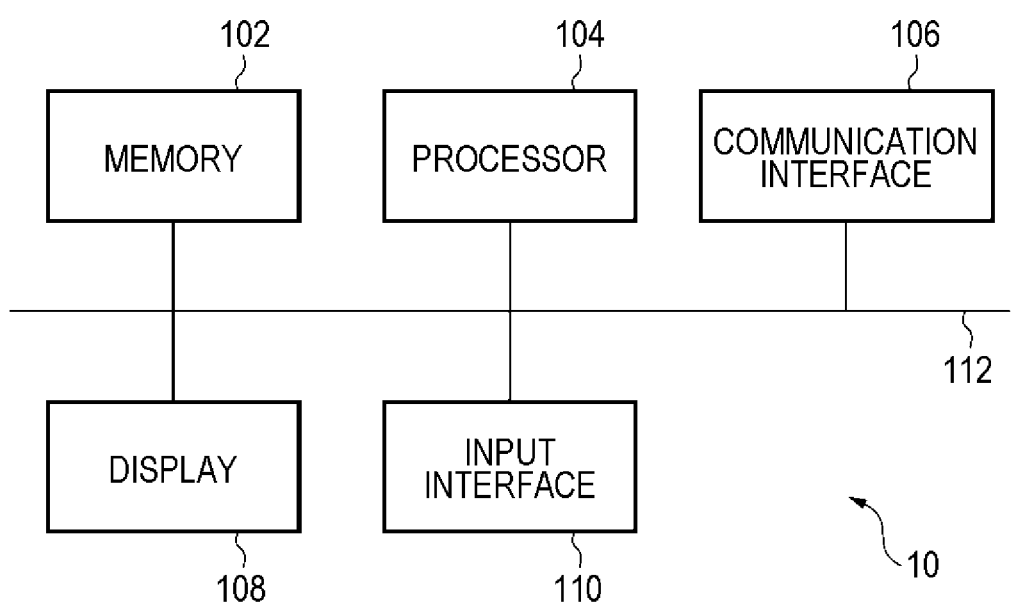
FIG. 2 is a hardware configuration diagram of an investment server in FIG. 1.

FIG. 2 is a hardware configuration diagram of an investment server 10 in FIG. 1. The investment server 10 includes a memory 102, a processor 104, a communication interface 106, a display 108 and an input interface 110. These components are connected to a bus 112 and communicate with each other via the bus 112.

The memory 102 is a storage area for storing data or a program. The data or program can be stored in the memory 102 permanently or temporarily. The processor 104 runs a program stored in the memory 102 to allow various functions of the investment server 10 to be implemented. The communication interface 106 is an interface that allows the investment server 10 to transmit and receive data to and from the outside. The communication interface 106 is connected to the network 6 and exchanges data with the portable terminal 4 or the information delivery server 8 via the network 6. The display 108 is a device for displaying various types of information. The input interface 110 is a device for receiving entry from an administrator of the point investment system 2.

Figure 3:
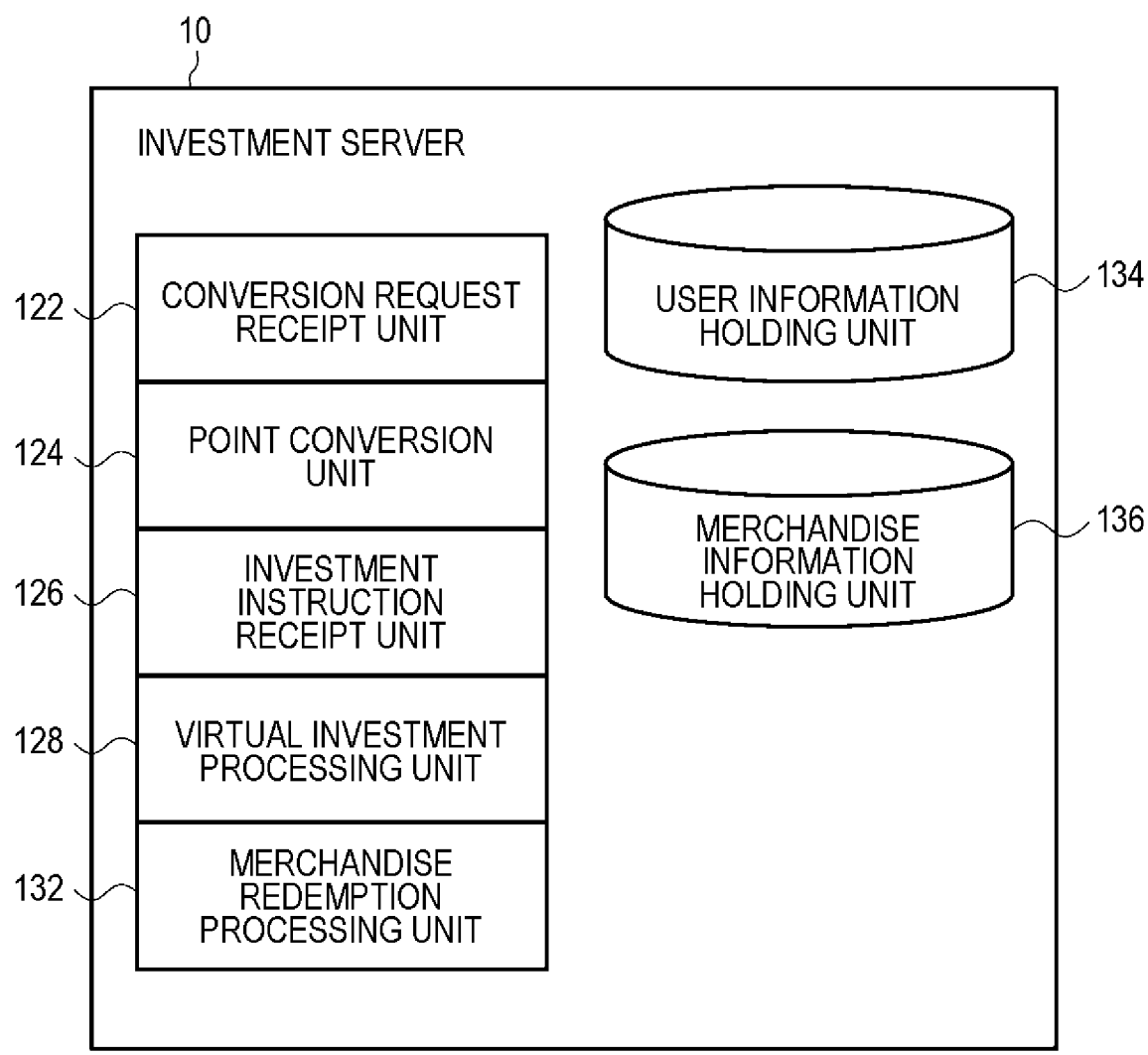
FIG. 3 is a block diagram illustrating the functions and configuration of the investment server in FIG. 1.

FIG. 3 is a block diagram illustrating the functions and configuration of the investment server 10 in FIG. 1. The respective blocks shown in this figure can be implemented by hardware such as a computer CPU and other devices or the machinery or can be implemented by software such as a computer program, but in this description, the illustrated functional blocks are implemented by their cooperation. Thus, it will be understood by those skilled in the art having reference to this specification that these functional blocks can be implemented in various forms by a combination of hardware and software.

The investment server 10 includes a conversion request receipt unit 122, a point conversion unit 124, an investment instruction receipt unit 126, a virtual investment processing unit 128, a merchandise redemption processing unit 132, a user information holding unit 134, and a merchandise information holding unit 136.

FIG. 4 is a diagram illustrating a data structure representing an example of the user information holding unit 134 in FIG. 3. The user information holding unit 134 holds a user ID used to identify a user, a password used as the user's qualification information, information regarding the user's earned points, and information regarding the user's investment points in association with each other. The earned point-related information includes the number of earned points possessed by the user. The investment point-related information includes the number of investment points possessed but remained uninvested by the user, the number of investment points invested, and investment contents. The investment contents include monetary currencies to be invested in FX, actual execution rate, trading position (short, long), amount of monetary currency possessed, ratio, specified profit amount for take-profit, specified loss amount for stop-loss, exchange rate for a limit order (herein simply referred to as a limit), and exchange rate for a stop order (herein simply referred to as a stop).

The example of FIG. 4 shows a case where a user with a user ID of "A0001" has the current earned points of "25000 pt", the investment points (remained uninvested) usable for FX investment of "1500 pt", the trading position of "long" for the monetary currency of "100" in "USD", and the execution rate of "100.00 pt/USD" upon taking a long position, so the investment trust points invested upon taking the long position are "10000 pt". It also shows the user settings such that a ratio of "lx", taking profits upon reaching "500 pt", and stopping loss upon reaching "300 pt", which are specified upon taking the long position. A function of automatically setting the limit and stop described later causes the limit to be set to "105.00 pt/USD" for the profit of "500 pt" and the stop to be set to "97.00 pt/USD" for the loss of "300 pt".

Figure 5:
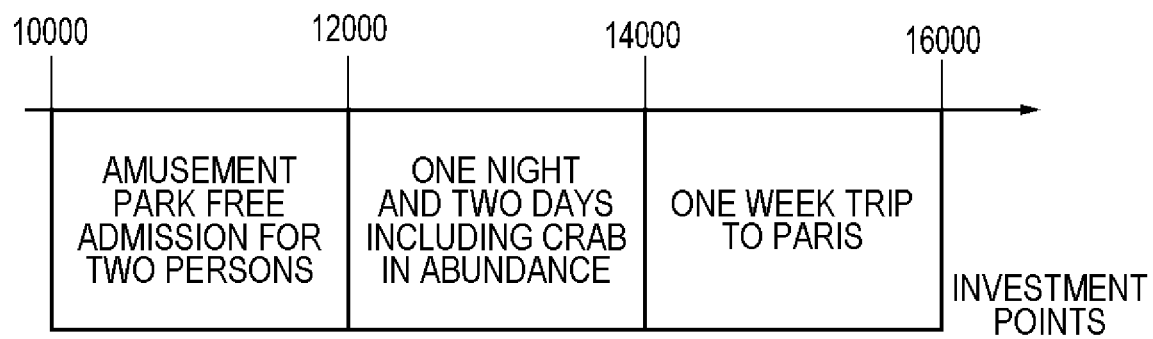
FIG. 5 is a schematic diagram illustrating an exemplary relationship between an investment point and merchandise in a point investment service.

FIG. 5 is a schematic diagram illustrating an exemplary relationship between an investment point and merchandise in a point investment service. The investment points are redeemable for the merchandise of predetermined attributes or types in the point investment service. In the example of FIG. 5, the investment points are redeemable for merchandise related to leisure or travel. In this example, the investment points have no use other than to be redeemed for merchandise related to leisure or travel, so the investment points correspond to merchandise of the type of leisure or travel. In other examples, the investment points can correspond to other types of merchandise such as appliances, groceries, and the like.

The merchandise is associated with the range of investment points and can be redeemed for investment points within their range. In the example of FIG. 5, a merchandise item of "amusement park free admission for two persons" is associated with the range of investment points "10000 to 11999 pt". A merchandise item of "one night and two days including crab in abundance" is associated with the range of investment points "12000 to 13999 pt". A merchandise item of "one week trip to Paris" is associated with the range of investment points "14000 to 15999 pt".

FIG. 6 is a diagram illustrating a data structure representing an example of the merchandise information holding unit 136 in FIG. 3. The merchandise information holding unit 136 stores a merchandise ID used to identify merchandise, the merchandise name, and the range of investment points redeemable for merchandise in association with each other.

Referring back to FIG. 3, the conversion request receipt unit 122 receives a request for conversion from earned points into investment points. This request is received from the portable terminal 4 of the user via the network 6. The portable terminal 4 receives an instruction to convert earned points into investment points from the user and transmits the conversion request to the investment server 10 via the network 6, which are performed on a conversion screen 502 described later. The conversion request includes the number of earned points subjected to the conversion.

In the point investment service achieved by the point investment system 2, the conversion of earned points into investment points is freely optional, and vice versa; that is, the conversion of investment points into earned points is also optional. In another embodiment, the conversion of investment points into earned points does not necessarily have to be subject to envision or implementation.

In the case where the conversion request receipt unit 122 receives the conversion request, the point conversion unit 124 converts earned points into investment points depending on the received request. The conversion rate from the earned points to the investment points in the point conversion unit 124 can be appropriately set by the provider of the point investment service. In one example, in the case where the conversion rate is set to two, if the number of earned points as a conversion source is "50 points", the number of investment points as a conversion destination is "100 points". The point conversion unit 124 updates the user information holding unit 134 with the conversion result. In addition, the point conversion unit 124 can notify a server (not shown) to be the earned point issuer of the user ID used to identify the user and the number of earned points to be a conversion source via the network 6. The earned point issuer can subtract the notified number of earned points from a user's earned point balance. The earned point issuer can provide the point investment service provider with compensation corresponding to the earned points that are consumed. The provider can also prepare merchandise (also referred to as a benefit) that is redeemable for the investment points using the compensation as a source of funds.

The investment instruction receipt unit 126 receives an investment instruction to invest the investment points obtained by the conversion from the portable terminal 4 of the user via the network 6. This investment instruction is an instruction relating to a new order for taking a new position. The investment instruction receipt unit 126 causes a display of the portable terminal 4 to display a new order receipt screen 504 (described later) that includes the exchange rate via the network 6. The portable terminal 4 receives a new order instruction to place a new order for FX using the investment points that remained uninvested by the user from the user through the new order receipt screen 504 and transmits the new order instruction to the investment server 10 via the network 6.

The new order instruction includes information as follows:
- Currencies to trade (USD, EUR, GBP, etc.)
- Position to be open (short, long)
- Number of investment points to trade
- Investment ratio (x1, x3, x10, etc.)
- Take-profit condition, i.e., an increase in the number of investment points of taking profits upon reaching a specified value
- Stop-loss condition, i.e., a decrease in the number of investment points of cutting losses upon reaching a specified value.

The virtual investment processing unit 128 causes the new order to be executed in response to the new order instruction received by the investment instruction receipt unit 126 at an actual exchange rate, which can differ from the exchange rate displayed on the new order receipt screen 504. Given that the number of investment points to be traded is A and the actual exchange rate is R, the virtual investment processing unit 128 sets A/R to be the executed transaction currency amount T (T=A/R). Given that the exchange rate displayed on the new order receipt screen 504 is S, there is a case of R≠S due to a time lag. In this case, the user placed a new order expecting that T'=A/S, but the order of T=A/R has been actually executed, which results in a trading result different from the user's intention. This is called "slippage" of the exchange rate. It is assumed in the present embodiment that the exchange rate slippage at the time of new order is allowed, but the exchange rate slippage does not occur at the time of settlement described later. The trading of the present embodiment is a virtual FX transaction, so unlike the actual trading, the system can optionally set whether or not the exchange rate slippage occurs.

The virtual investment processing unit 128 sets a limit for the new order on the basis of the executed transaction currency amount T, take-profit condition, actual exchange rate R upon the execution, and investment ratio. Given that an increase in the number of investment points included in the take-profit condition is $\Delta I$, the limit to be set is Q, and the investment ratio is N, the virtual investment processing unit 128 sets the limit Q for the long position as in the formula expressed below:

$$Q=R+\Delta I/(T\times N).$$

This formula is derived from $$\Delta I=(Q-R)\times T\times N.$$

The virtual investment processing unit 128 sets the limit Q for the short position as in the formula expressed below:

$$Q=R-\Delta I/(T\times N).$$

This formula is derived from $$\Delta I=(R-Q)\times T\times N.$$

The virtual investment processing unit 128 sets the stop for the new order on the basis of the executed transaction currency amount T, stop-loss condition, actual exchange rate R upon the execution, and investment ratio N. Given that a decrease in the number of investment points included in the stop-loss condition is $\Delta J$, the stop to be set is P, and the investment ratio is N, the virtual investment processing unit 128 sets the stop P as in the formula expressed below:

$$P=R-\Delta J/(T\times N).$$

This formula is derived from $$\Delta J=(R-P)\times T\times N.$$

The virtual investment processing unit 128 sets the stop P for the short position as in the formula expressed below:

$$P=R+\Delta J/(T\times N).$$

This formula is derived from $$\Delta J=(P-R)\times T\times N.$$

The automatic setting function for the limit and stop is described using an example. Suppose that the user specifies 100000 pt and places an order to take the long position in the case where the exchange rate displayed on the new order receipt screen 504 is 100.00 pt/USD. In that case, the user expects to take the long position of 1000 USD, but the exchange rate slippage of 101.01 pt/USD actually causes the long position of 100000/101.01≈990 USD to be taken. Here, if the user specifies an increase in the number of investment points to take a profit of 5000 pt and the investment ratio of x1, the limit is calculated and set automatically as below:

101.01 (pt/USD)+5000 (pt)/(990 (USD)×1)≈106.06 (pt/USD). If the user specifies a decrease in the number of investment points to cut a loss of 3000 pt and the investment ratio of x1, the stop is calculated and set automatically as below:

101.01 (pt/USD)−3000 (pt)/(990 (USD)×1)≈97.98 (pt/USD).

If the exchange rate slippage does not occur, the long position of 1000 USD is taken as expected by the user, so the limit is 105.00 pt/USD for the take-profit line of 5000 pt, and the stop is 97.00 pt/USD for the stop-loss line of 3000 pt. Thus, the automatically set limit and stop will become different from the limit and stop expected by the user from the display rate. However, if the profit is taken at the limit automatically set, the result will be 106.06 (pt/USD)×990 (USD)≈105000 (pt), and the increment in investment points as specified by the user (=5000 pt) is obtained. Similarly, if the loss is cut at the stop automatically set, the result will be 97.98 (pt/USD)×990 (USD)≈97000 (pt), and the decrement in investment points as specified by the user (=3000 pt) is obtained.

In the present embodiment, the number of investment points to be traded is fixed in new orders, and the exchange rate slippage is absorbed by fluctuations in the executed transaction currency amounts. On the other hand, it is also conceivable to fix the transaction currency amount and absorb the exchange rate slippage by the fluctuation in the number of investment points. In this case, using the same assumption as in the example above, the long position of 1000 USD would be taken using 101010 pt. The limit is 101.01+5000/1000=106.01 pt/USD for the take-profit line of 5000 pt, and the stop is 101.01−3000/1000=98.01 pt/USD for the stop-loss line of 3000 pt. If the profit is taken at this limit, the result will be 106.01 (pt/USD)×1000 (USD) ≈106010 (pt), which causes a deviation from the user-specified increment (106010−105000=1010). Similarly, if the loss is cut at the stop, the result will be 98.01 (pt/USD)× 1000 (USD)=98010 (pt), which causes a deviation from the user-specified decrement (98010−97000=1010).

Absorbing the exchange rate slippage by fluctuations in the number of investment points as described above makes the increase or decrease of investment points upon taking profits or cutting losses different from the user's expectation. The values of merchandise varying stepwise in the present embodiment make such an unexpected result unfavorable for the user. This is because the user often tightly sets the take-profit line or stop-loss line. On the other hand, in the case where the number of investment points to be traded is fixed and the exchange rate slippage is incorporated into the transaction currency amount obtained as a result of the execution to achieve the automatic setting of the limit and stop, the investment points are caused to increase or decrease as expected by the user upon take-profit or stop-loss. Thus, it is possible for the point investment system 2 with the value of merchandise changing stepwise to achieve a suitable automatic setting of the limit and the stop.

The virtual investment processing unit 128 monitors the exchange rate and, upon satisfying a take-profit execution condition for a position for which the take-profit condition is set, settles (closes) the position at the set limit. The take-profit execution condition is met when the exchange rate exceeds the limit, for example, in the case of the long position, in which case the limit itself is settled rather than the actual exchange rate exceeding the limit. The take-profit execution condition, for example, is met when the exchange rate falls below the limit in the case of the short position, and in this case, as well, the limit itself is settled rather than the actual exchange rate falling below the limit.

The virtual investment processing unit 128 monitors the exchange rate and, upon satisfying a stop-loss execution condition for a position for which the stop-loss condition is set, settles the position at the set stop. The stop-loss execution condition is met when the exchange rate falls below the stop, for example, in the case of the long position, in which case the stop itself is settled rather than the actual exchange rate falling below the stop. The stop-loss execution condition, for example, is met when the exchange rate exceeds the stop in the case of the short position, and in this case, as well, the stop itself is settled rather than the actual exchange rate exceeding the stop.

The virtual investment processing unit 128 causes the display of the portable terminal 4 of the user to display a market order settlement receipt screen (described later) via the network 6. The market order settlement receipt screen includes the exchange rate. The portable terminal 4 receives a market order settlement instruction to make a market order settlement from the user on the market order settlement receipt screen and transmits it to the investment server 10 via the network 6. The virtual investment processing unit 128, upon receiving the market order settlement instruction, settles the target position at the exchange rate displayed on the market order settlement receipt screen.

The merchandise redemption processing unit 132 receives a redemption instruction to redeem the investment points increased or decreased as a result of FX investment for merchandise from the portable terminal 4 of the user via the network 6. The merchandise redemption processing unit 132 refers to the merchandise information holding unit 136 on the basis of the received redemption instruction and performs merchandise redemption processing. The merchandise redemption processing unit 132 causes the display of the portable terminal 4 of the user to display a merchandise redemption screen (described later) via the network 6. This merchandise redemption screen includes a list of merchandise items that are redeemable for the user's current investment points. The portable terminal 4 receives a redemption instruction including designation to a merchandise item as the redemption destination from the user via the merchandise redemption screen and transmits the received redemption instruction to the investment server 10 via the network 6. The merchandise redemption processing unit 132 refers to the merchandise information holding unit 136 to read out the lower limit value of investment points corresponding to the designated merchandise. The merchandise redemption processing unit 132 accesses the user information holding unit 134 and subtracts the read lower limit value of investment points from the investment points that remained uninvested by the user. The merchandise redemption processing unit 132 also performs processing for making the designated merchandise the user's property.

The operation of the investment server 10 having the configuration described above is described.

Figure 7:
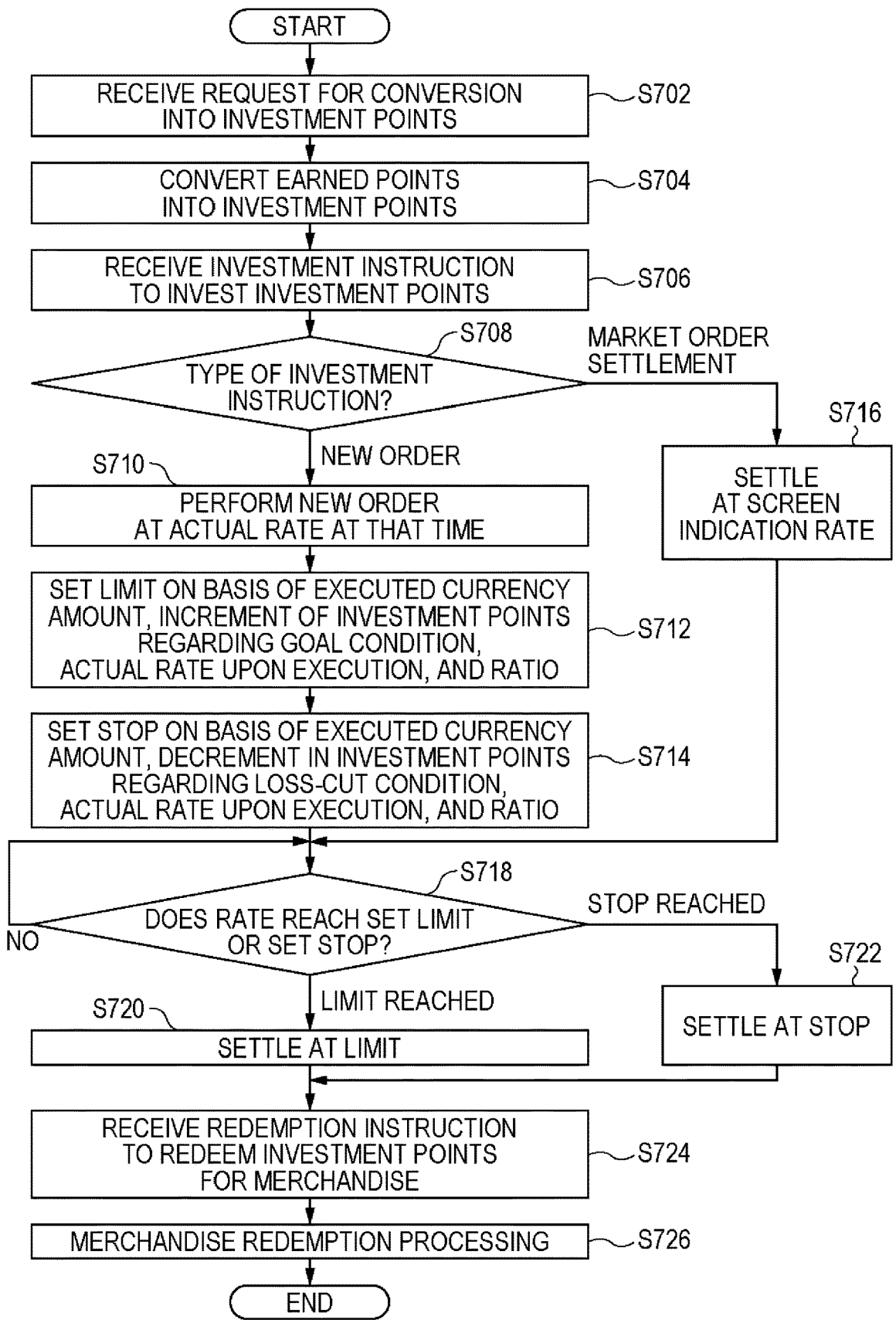
FIG. 7 is a flowchart illustrating the procedure of a series of processing steps in the investment server of FIG. 1.

FIG. 7 is a flowchart illustrating the procedure of a series of processing steps in the investment server 10 of FIG. 1. The investment server 10 receives a request for conversion of earned points into investment points (S702). The investment server 10 performs processing for converting earned points into investment points in response to the received request (S704). The investment server 10 registers the conversion result in the user information holding unit 134.

The investment server 10 receives an investment instruction to invest the investment points (S706). The investment server 10 discriminates the type of the received investment instruction (S708). If the investment instruction is a market order settlement instruction ("market order settlement" in S708), the investment server 10 performs market order settlement at a screen indication rate, which is the exchange rate displayed on the market order settlement receipt screen (S716).

If the investment instruction is a new order instruction ("new order" in S708), the investment server 10 performs the new order at the actual rate at that time (S710). The investment server 10 sets a limit on the basis of the executed currency amount, the increment of investment points regarding the take-profit condition, the actual rate upon the execution, and the ratio (S712). The investment server 10 sets a stop on the basis of the executed currency amount, the decrement in investment points regarding the stop-loss condition, the actual rate upon the execution, and the ratio (S714). The investment server 10 registers the executed currency amount, the set limit, and the set stop in the user information holding unit 134.

The investment server 10 monitors the exchange rate and determines whether the exchange rate reaches the set limit or the set stop (S718). If the limit is reached ("limit reached" in S718), the investment server 10 settles the target position at the limit (S720). If the stop is reached ("stop reached" in S718), the investment server 10 settles the target position at the stop (S722).

The investment server 10 receives the redemption instruction to redeem investment points for merchandise (S724). The investment server 10 performs the merchandise redemption processing (S726).

Figure 8:
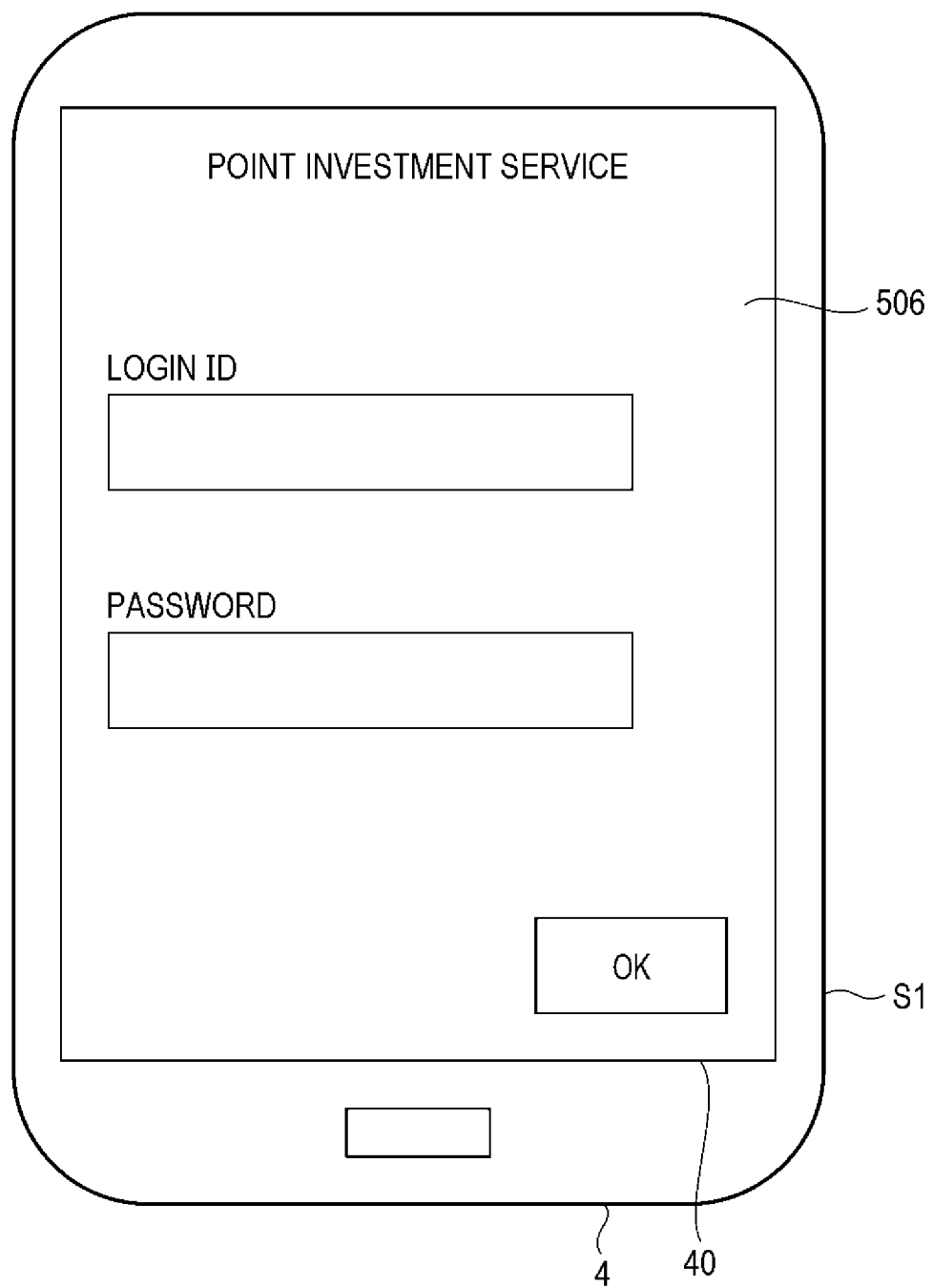
FIG. 8 is a diagram illustrating a typical login screen displayed on a display of a portable terminal.

FIG. 8 is a diagram illustrating a typical screen of a login screen 506 displayed on a display 40 of the portable terminal 4. The user enters a user ID and a password on the login screen 506 and taps the "OK" button. The portable terminal 4 acquires the entered user ID and password in response to the detection of the tap operation and transmits them to the investment server 10 via the network 6. The investment server 10 collates the user ID and password registered in the user information holding unit 134 with the received user ID and password to perform user authentication. The investment server 10 transmits information indicating success or failure of user authentication to the portable terminal 4 via the network 6. The portable terminal 4 causes the display 40 to display a home screen 500 when the user authentication is successful and causes the display 40 to display a predetermined error screen (not shown) when the user authentication fails.

Figure 9:
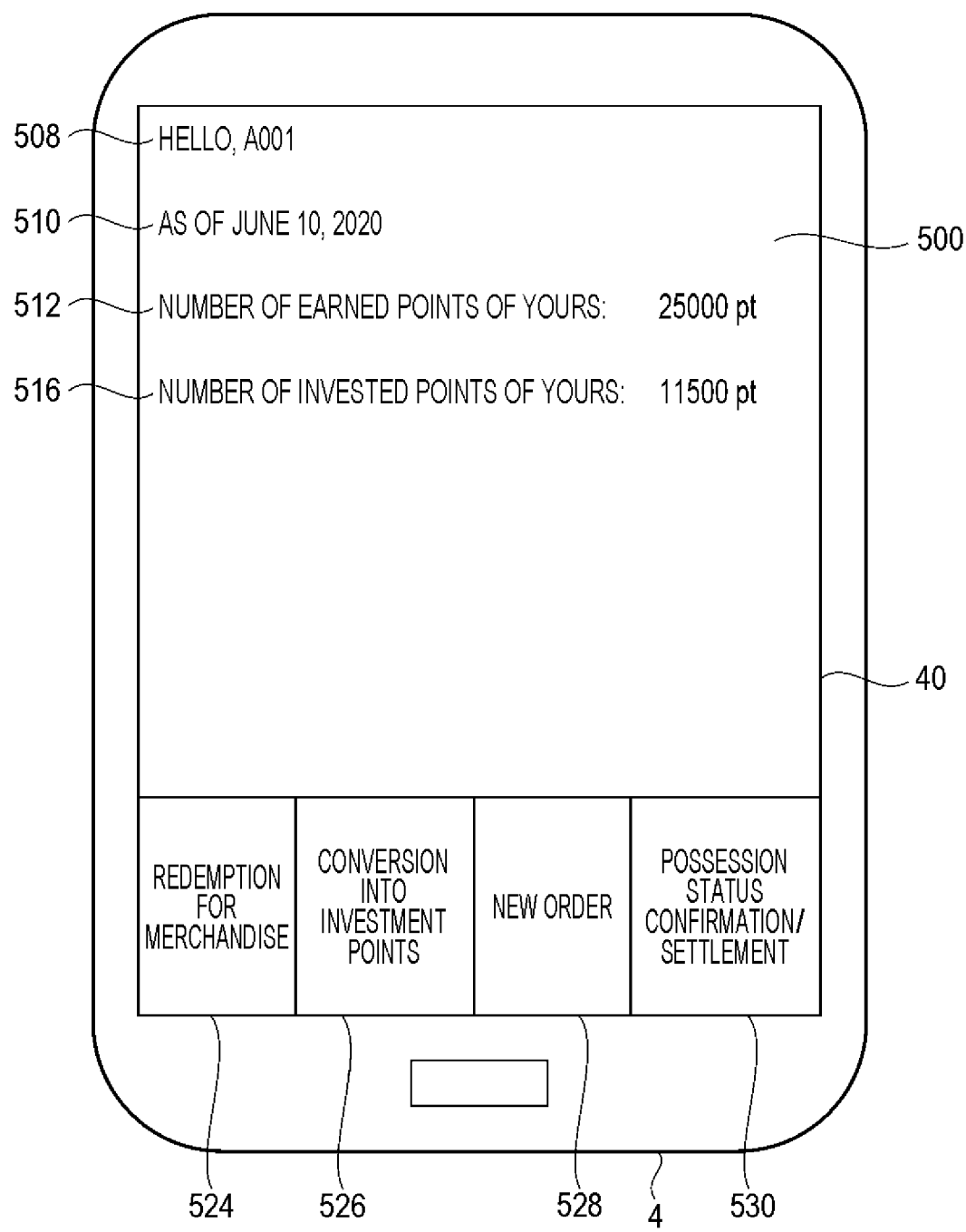
FIG. 9 is a diagram illustrating a typical home screen displayed on the display of the portable terminal.

FIG. 9 is a diagram illustrating a typical screen of the home screen 500 displayed on the display 40 of the portable terminal 4. The home screen 500 displays a user ID 508 of a user who has been successfully authenticated (or logged in), current time and date 510, and an overview of the points possessed by the user. In particular, the home screen 500 displays the number of earned points 512 possessed by the user and the number of invested points 516 possessed by the user. The home screen 500 is provided with a "redemption for merchandise" button 524, a "conversion into investment points" button 526, a "new order" button 528, and a "pos-session status confirmation/settlement" button 530, each of which functions as a flow line directing to their corresponding functions.

Figure 10:
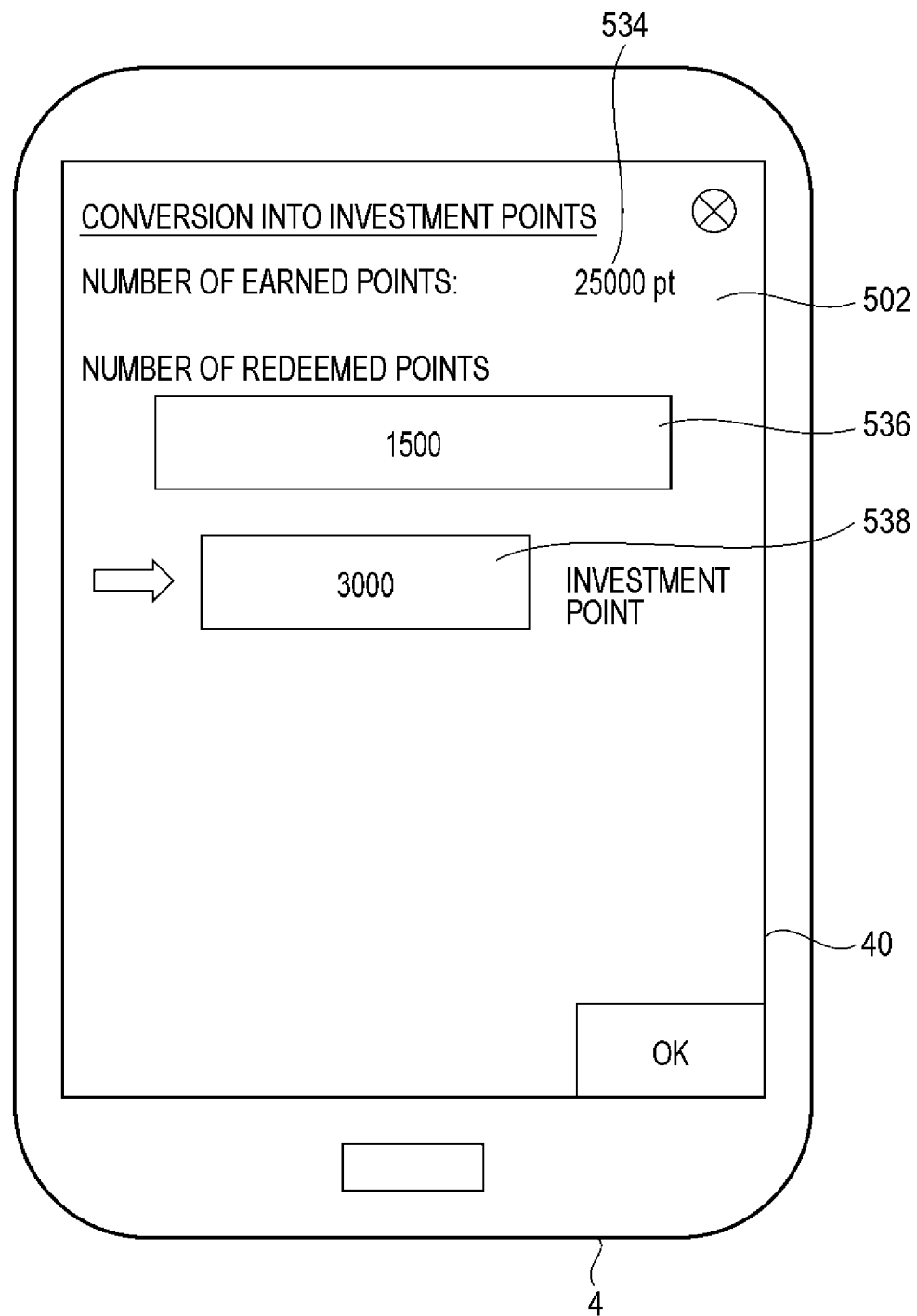
FIG. 10 is a diagram illustrating a typical conversion screen displayed on the display of the portable terminal.

Upon detecting the tap operation on the conversion into investment points button 526, the portable terminal 4 displays a conversion screen 502 on the display 40. FIG. 10 is a diagram illustrating a typical screen of the conversion screen 502 displayed on the display 40 of the portable terminal 4. The conversion screen 502 has a number of earned points 534 a number of earned points 534, a conversion source earned point number entry/display region 536, a conversion destination investment point number entry/display region 538, and a caution notice display region 542. If the user enters the desired number of earned points in the conversion source earned point number entry/display region 536, the conversion destination investment point number corresponding to the number of earned points being entered is calculated and displayed in the conversion destination investment point number entry/display region 538. In contrast, if the user enters the desired number of investment points in the conversion destination investment point number entry/display region 538, the conversion source earned point number corresponding to the entered investment point number is calculated and displayed in the conversion source earned point number entry/display region 536. The caution notice display region 542 includes text that the investment points, once converted from the earned points, are irreversible to the earned points.

Upon detecting the tap operation on the OK button of the conversion screen 502, the portable terminal 4 generates a conversion request including the number of earned points entered or displayed in the conversion source earned point number entry/display region 536 and transmits it to the investment server 10 via the network 6. The investment server 10 processes the conversion request as described above.

Figure 11:
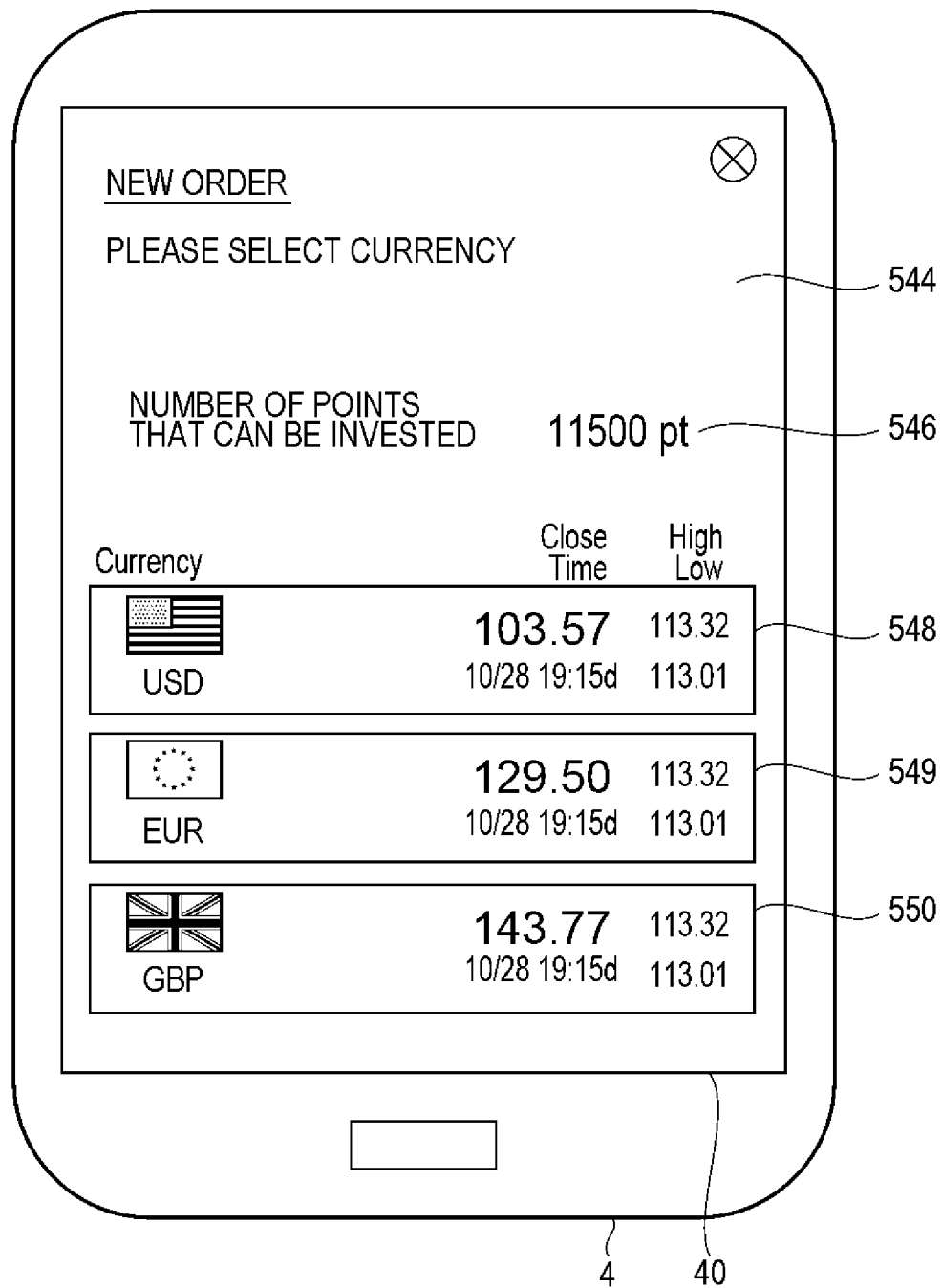
FIG. 11 is a diagram illustrating a typical investment target selection screen displayed on the display of the portable terminal.

Upon detecting the tap operation on the new order button 528 of the home screen 500, the portable terminal 4 causes the display 40 to display an investment target selection screen 544. FIG. 11 is a diagram illustrating a typical screen of the investment target selection screen 544 displayed on the display 40 of the portable terminal 4. The investment target selection screen 544 has an investment point number 546 possessed but remained uninvested by the user and a plurality of investment target objects 548, 549, and 550. Each investment object indicates the currency image and name, the exchange rate, the time of day, and the highest and lowest prices of the day. In one example, the first investment object 548 corresponds to the United States Dollar (USD), the second investment object 549 corresponds to Euro (EUR), and the third investment object 550 corresponds to British Pound (GBP).

Figure 12:
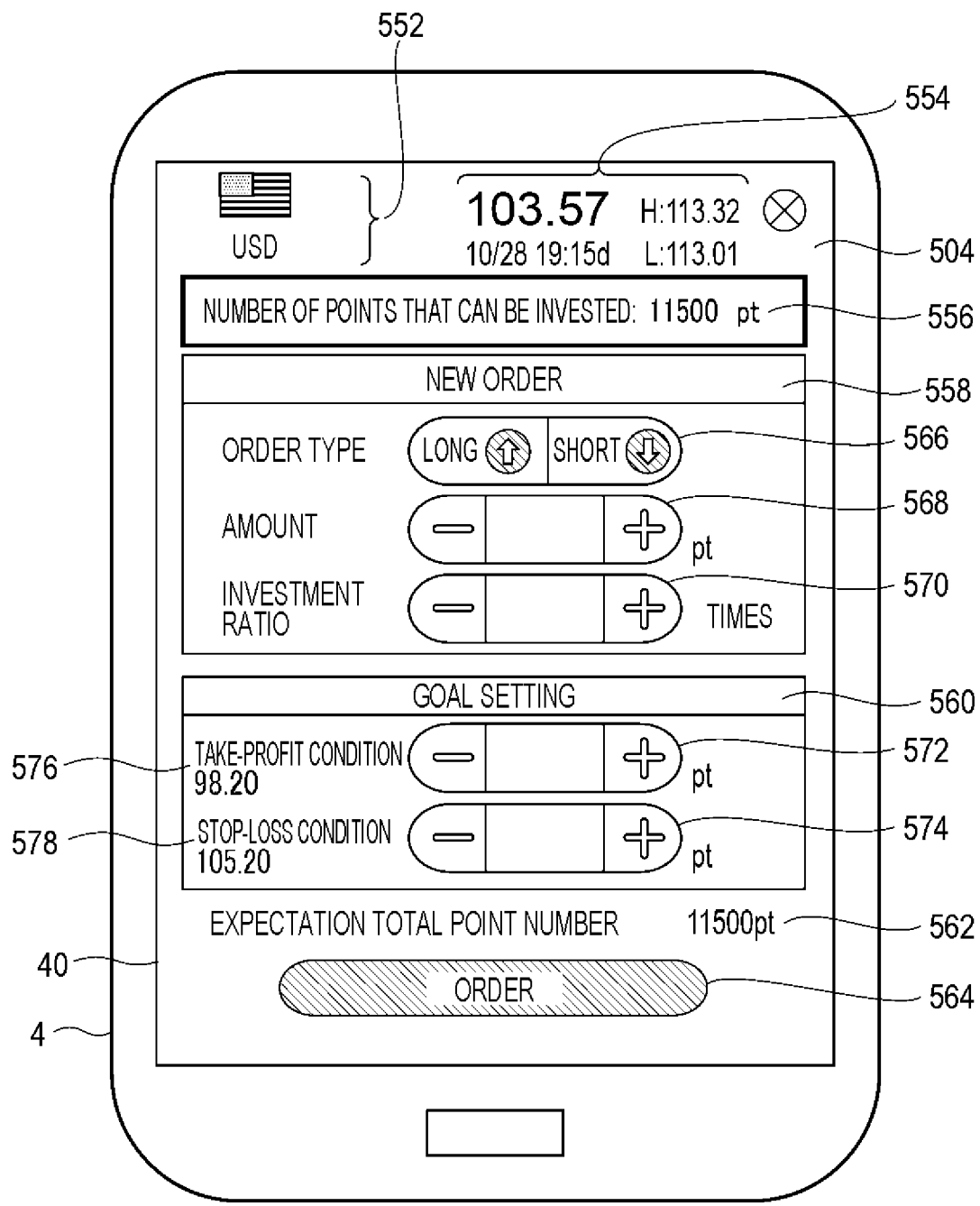
FIG. 12 is a diagram illustrating a typical new order receipt screen displayed on the display of the portable terminal.

Upon detecting the tap operation on one of the investment target objects included in the investment target selection screen 544, the portable terminal 4 causes the display 40 to display the new order receipt screen 504. FIG. 12 is a diagram illustrating a typical screen of the new order receipt screen 504 displayed on the display 40 of the portable terminal 4. The order receipt screen 504 has the currency image and name 552 corresponding to the investment target object in which the tap operation is detected on the investment target selection screen 544, that is, the investment target object selected by the user. The order receipt screen 504 also has a status display region 554 that indicates the status of the currency, such as the exchange rate, the time, or the highest and lowest prices of the day. The order receipt screen 504 also has an investment point number 556 that is possessed but remained uninvested by the user, a new order entry/display region 558 that is used to enter or display details of a new order, a goal entry/display region 560 that is used to enter or display take-profit and stop-loss conditions, an expectation total point number display region 562, and an order button 564. Entering a goal condition can be optional, in which case the goal entry/display region 560 can be hidden by default.

The new order entry/display region 558 includes an order type specifying region 566 used to receive a designation of the type of an order, a point number entry region 568 used to receive entry of the number of investment points to be traded, and an investment ratio entry region 570 used to receive entry of the investment ratio. The user selects a position intended to be taken from "short" or "long" on the order type specifying region 566 and enters the number of investment points to be invested in the point number entry region 568. This entry can be made by directly entering numbers or by using the left and right "+" and "−" buttons in the point number entry region 568. Similarly, the user enters an investment ratio in an investment ratio entry region 570.

The goal entry/display region 560 includes an incremental number entry region 572 that receives an entry of an incremental number of investment points regarding the take-profit condition, a decremental number entry region 574 that receives an entry of a decremental number of investment points regarding the stop-loss condition, a provisional limit 576, and a provisional stop 578. The user enters the incremental number of investment points, which is considered acceptable for take-profit by the user, in the incremental number entry region 572 and enters the decremental number of investment points, which is considered acceptable for stop-loss by the user, in the decremental number entry region 574. If a numerical value is entered in the incremental number entry region 572, its corresponding limit is calculated on the basis of the exchange rate indicated in the status display region 554 and indicated in the region of the provisional limit 576. If a numerical value is entered in the decremental number entry region 574, its corresponding stop is calculated on the basis of the exchange rate indicated in the status display region 554 and indicated in the region of in the provisional stop 578. The expectation total point number display region 562 indicates the number of investment points if the take-profit condition is achieved.

Upon detecting the tap operation on the order button 564, the portable terminal 4 generates a new order instruction and transmits it to the investment server 10 via the network 6. This new order instruction includes the selected currency, the position specified in the order type specifying region 566, the number of investment points entered in the point number entry region 568, the investment ratio entered in the investment ratio entry region 570, the incremental number entered in the incremental number entry region 572, and the decremental number entered in the decrement number input area 574. The investment server 10 performs the new order processing described above on the basis of the received new order instruction.

Figure 13:
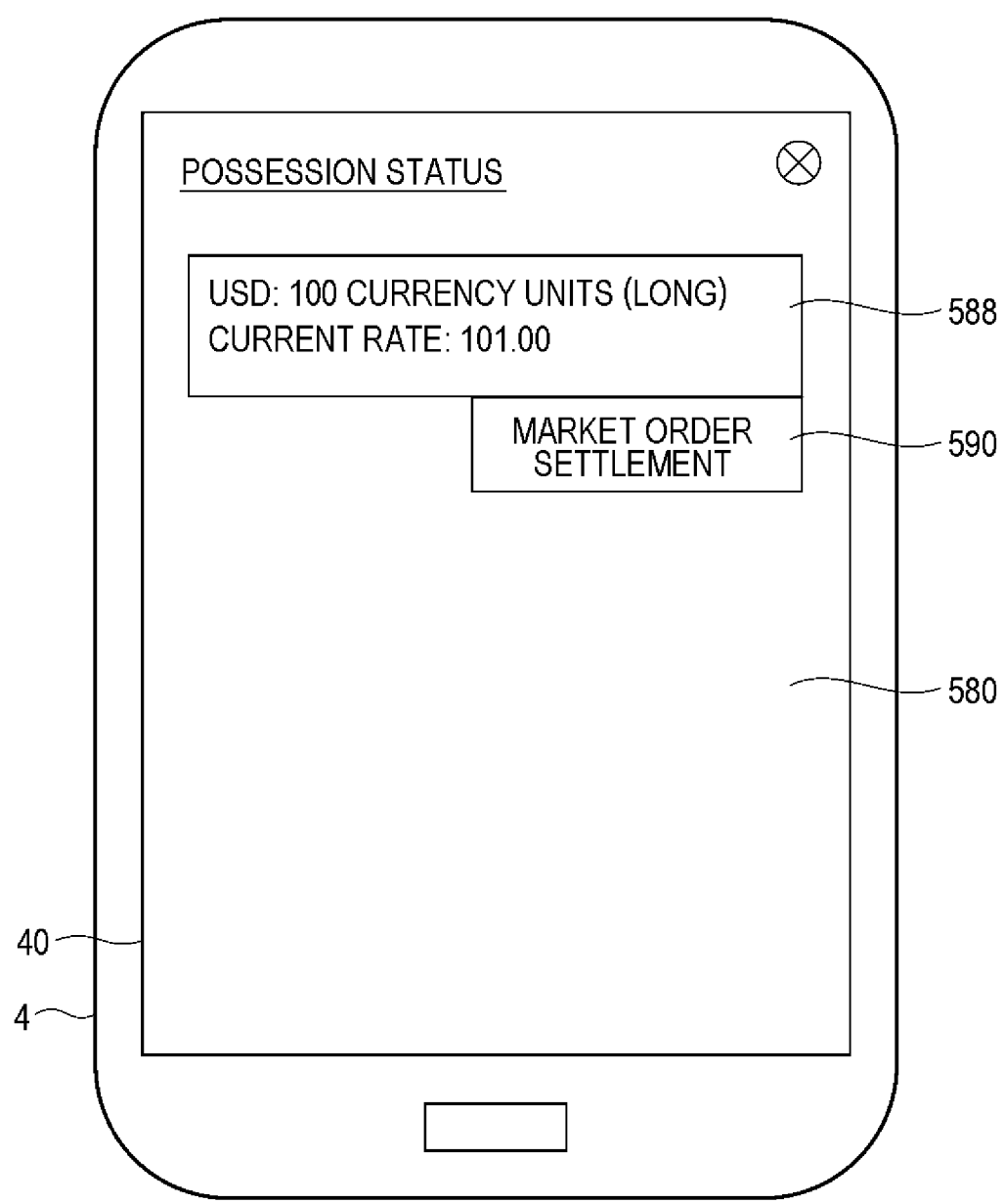
FIG. 13 is a diagram illustrating a typical possession status display screen displayed on the display of the portable terminal.

Upon detecting the tap operation on the possession status confirmation/settlement button 530 of the home screen 500, the portable terminal 4 causes the display 40 to display a point possession status display screen 580. FIG. 13 is a diagram illustrating a typical screen of the possession status display screen 580 displayed on the display 40 of the portable terminal 4. The point possession status display screen 580 has an object being invested 588 corresponding to a position being invested. The object being invested 588 indicates the name of the currency being invested, the currency amount possessed, the type of position, the current exchange rate, and a market order settlement button 590.

Figure 14:
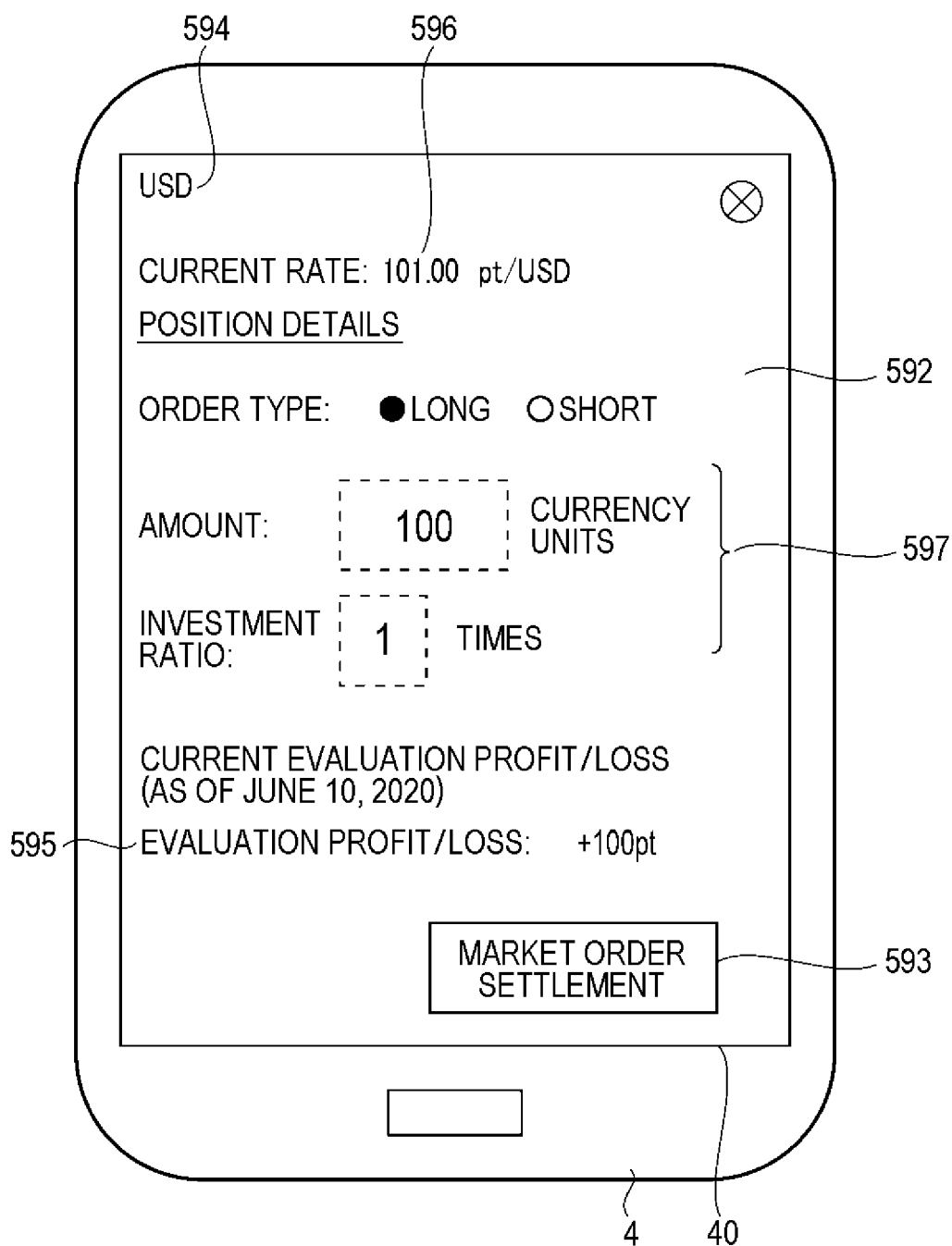
FIG. 14 is a diagram illustrating a typical market order settlement receipt screen displayed on the display of the portable terminal.

Upon detecting the tap operation on the market order settlement button 590 of one of the objects being invested 588 included in the possession status display screen 580, the portable terminal 4 causes the display 40 to display a market order settlement receipt screen 592. FIG. 14 is a diagram illustrating a typical screen of the market order settlement receipt screen 592 displayed on the display 40 of the portable terminal 4. The market order settlement receipt screen 592 indicates a currency name 594 with a position corresponding to the object being invested upon detecting the tap operation on the possession status display screen 580, that is, the object being invested that is selected by the user. The market order settlement receipt screen 592 also indicates a current exchange rate 596 of the relevant currency, a position detail display region 597 that indicates details of the position, a position evaluation profit/loss 595, and a market order settlement button 593. Upon detecting the tap operation on the market order settlement button 593, the portable terminal 4 generates a market order settlement instruction and transmits it to the investment server 10 via the network 6. The market order settlement instruction includes information used to specify the position indicated on the market order settlement receipt screen 592. Upon receiving the market order settlement instruction, the investment server 10 settles the target position at the current exchange rate 596 indicated on the market order settlement receipt screen 592.

Figure 15:
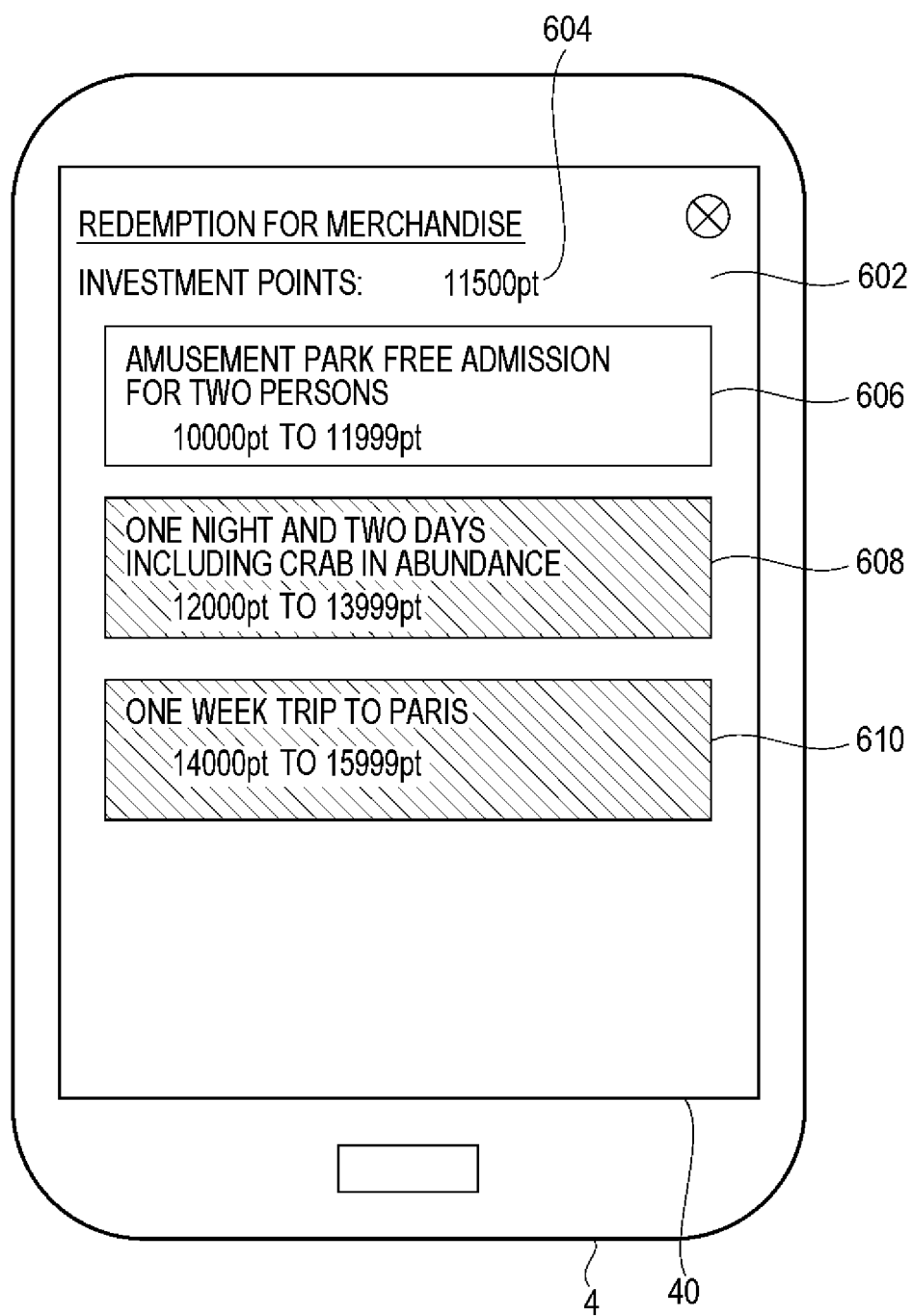
FIG. 15 is a diagram illustrating a typical merchandise redemption screen displayed on the display of the portable terminal.

Upon detecting the tap operation on the redemption for merchandise button 524 of the home screen 500, the portable terminal 4 causes the display 40 to display a merchandise redemption screen 602. FIG. 15 is a diagram illustrating a typical screen of the merchandise redemption screen 602 displayed on the display 40 of the portable terminal 4. The merchandise redemption screen 602 displays a user investment point number 604 of points (e.g., uninvested points) that are usable for redemption for merchandise and merchandise objects 606, 608, and 610 that correspond to merchandise provided by the point investment service. Each merchandise object indicates the name of the merchandise and the range of investment points that can be redeemed for the merchandise. In the example of FIG. 15, the redeemable investment points possessed by the user are 11500 pt, falling within the range of 10000 to 11999 pt of the first merchandise object 606 among three merchandise objects 606, 608, and 610 displayed. However, they do not fall within the range of the second merchandise object 608 (12000 to 13999 pt) and the third merchandise object 610 (14000 to 15999 pt). Thus, the first merchandise object 606 is indicated as selectable, but both the second merchandise object 608 and the third merchandise object 610 are indicated as non-selectable, such as grayed out or dimmed. Actually, tapping on the second merchandise object 608 and the third merchandise object 610 is unaccepted in the state of FIG. 15. Moreover, if the user investment points were 12500 pt, the second merchandise object 608 would be indicated as selectable on the merchandise redemption screen 602, but both the first merchandise object 606 and the third merchandise object 610 would be indicated as non-selectable.

Figure 16:
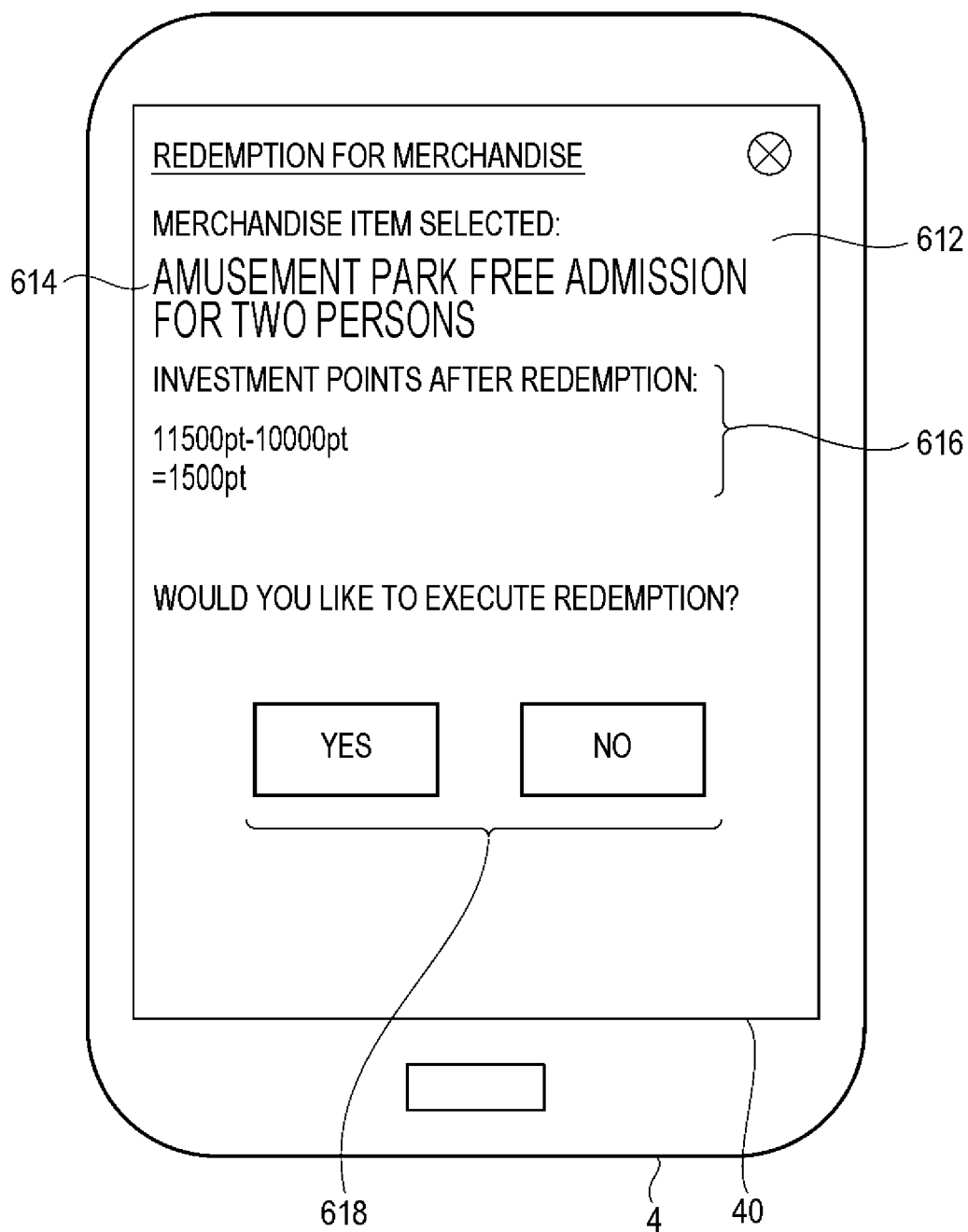
FIG. 16 is a diagram illustrating a typical merchandise application screen displayed on the display of the portable terminal.

Upon detecting the tap operation on one of the selectable merchandise objects included in the merchandise redemption screen 602, the portable terminal 4 causes the display 40 to display a merchandise application screen 612. FIG. 16 is a diagram illustrating a typical screen of the merchandise application screen 612 displayed on the display 40 of the portable terminal 4. The merchandise application screen 612 indicates a merchandise object name 614, a detail display region 616, and YES and NO buttons 618. The merchandise object name 614 is the name of the merchandise object in which the tap operation is detected on the merchandise redemption screen 602, that is, the merchandise item selected by the user. The detail display region 616 represents the change in investment points in the case of the redemption for merchandise. Upon detecting the tap operation on the YES button of the YES and NO buttons 618, the portable terminal 4 generates a redemption instruction used to specify the merchandise displayed on the merchandise application screen 612 as the merchandise to be redemption destination and transmits it to the investment server 10 via the network 6.

In the above embodiment, examples of the storage unit are a hard disk and a semiconductor memory. In addition, it will be appreciated by those skilled in the art referred to herein, on the basis of the description in this specification, each unit is implemented by a CPU (not shown), a module of an installed application program, a module of a system program, and a semiconductor memory for temporarily storing the contents of data read from a hard disk.

FIG. 17 is a diagram illustrating a table sorting and listing the presence or absence of slippage in the present embodiment.

The point investment system 2 according to the present embodiment has the mechanism for ensuring that there is no exchange rate slippage in all of the take-profit, stop-loss, and market order settlements to secure that the user is able to redeem the merchandise as expected at the timing of settlement. Without this mechanism, the exchange rate slippage could result in, for example, one point less than expected, which causes a situation where the redemption for the desired merchandise is failed. The present embodiment has no slippage in all settlement types, so the user is not disadvantaged, and the settlement rate becomes the value expected by the user, achieving an easy-to-understand UX.

On the other hand, the present embodiment allows exchange rate slippage upon a new order. This is because if the exchange rate slippage upon a new order is not allowed, there is a possibility of inducing fraudulent orders such as arbitrage. However, the present embodiment described above automatically corrects the limit rate and the stop rate so that the points of the take-profit and stop-loss set by the user upon the order do not change even when the exchange rate slips upon the settlement. This configuration makes it possible to prevent or reduce the influence on the user due to the exchange rate slippage upon a new order.

Arbitrage can be a fraudulent transaction, including the case where, supposing there are a trader A with a fast rate update and a trader B with a slow rate update, a buy order is placed using the trader B if trader A's rates increase and trader B's rates hardly fluctuate, and a sell order is placed using the trader A if trader A's rates decrease and trader B's rates hardly fluctuate while monitoring rates of traders A and B.

Further, the point investment system 2 according to the present embodiment associates the range of merchandise items with investment points, so the user sets the number of points to take profits and the number of points to cut losses considering a clear target value of investment points, for example, the lower limit of the range of desired merchandise items. In one example, if the current points are 4500 pt and they can be redeemed for the desired merchandise when reaching 5000 pt, a clear reminder is given that the take-profit line is 500 pt as the take-profit line is clearly reminded. The point investment system 2 according to the present embodiment is allowed to specify the take-profit condition and the stop-loss condition using the number of points, so it is possible to save the time or labor of back-calculating the exchange rate from the target incremental or decremental value of the investment points compared to the case of specifying the exchange rate. Furthermore, even if the exchange rate slips upon a new order, it is possible to automatically set the limit and stop to achieve the specified take-profit condition and stop-loss condition, further reducing the user's calculation burden.

The configuration and operation of the point investment system 2 according to an embodiment are described above. The present embodiment is an exemplification, and it is understood by those skilled in the art that various modifications can be made to the combination of each component and each processing, and such modifications are also within the scope of the present invention.

The description above in the embodiment is given the case of earning and investing points, but the technical concept of the present embodiment is applicable to any electronic value, including not only points but also coupons, mileages, coins, chips, etc. Electronic values can be defined as those in which property values such as monetary amounts are electronically described or recorded and do not fall under prepaid payment instruments as stipulated by the Payment Services Act in Japan.

The description above in the embodiment is given the case where the investment server 10 performs virtual investment, but the embodiment is not limited to the above exemplary case. The processing for performing actual investment such as actual stock trading or foreign exchange trading can be performed.

Figure 18:
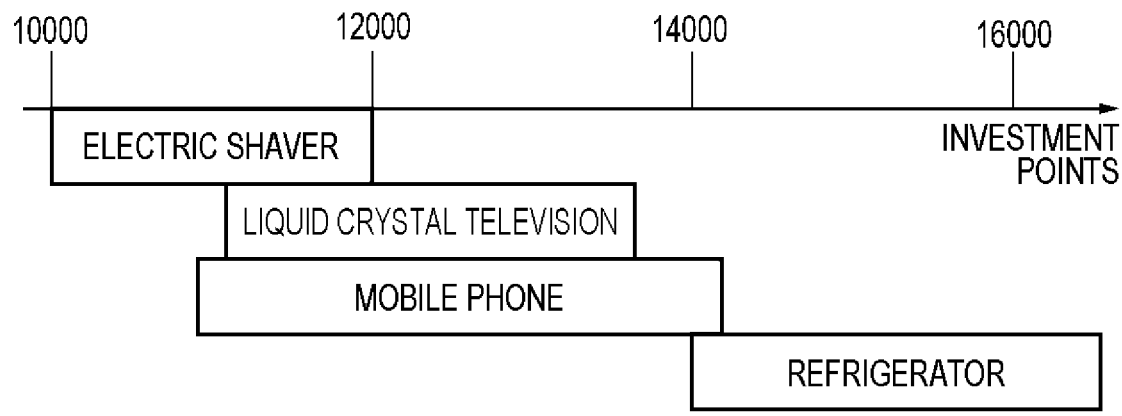
FIG. 18 is a schematic diagram illustrating an exemplary relationship between an investment point and merchandise according to a modification.

The description above in the embodiment is given the case where the values of the merchandise are set in steps, but the embodiment is not limited to this exemplary case. Other modes can be used as long as the range of merchandise items corresponds to the range of investment points. For example, the range of investment points for a merchandise item A and the range of investment points for a merchandise item B can at least partially overlap. FIG. 18 is a schematic diagram illustrating an exemplary relationship between an investment point and merchandise according to a modification. In the example of FIG. 18, the investment points can be redeemed for merchandise items belonging to home appliances. In this example, the investment points have no use other than to be redeemed for merchandise items belonging to home appliances, so the investment points correspond to the type of merchandise of the home appliance. The merchandise is associated with the range of investment points and can be redeemed for investment points within their range. In the example of FIG. 18, a merchandise item "electric shaver" is associated with the investment point of the range "10000 to 11999 pt", and a merchandise item "liquid crystal television" is associated with the investment point of the range "11000 to 13500 pt". In other words, the range of investment points for the merchandise item "electric shaver" and the range of investment points for the merchandise item "liquid crystal television" overlap in the range of "11000 to 11999 pt". A merchandise item "mobile phone" is associated with the investment point of the range "10800 to 14100 pt". In other words, the range of investment points for the merchandise item "mobile phone" contains the range of investment points for the merchandise item "liquid crystal television".

The description above in the embodiment is given the case where the remaining investment points (fractions) after being redeemed for merchandise are returned to the user.

However, the embodiment is not limited to this exemplary case. For example, in the merchandise redemption processing, the fractions of the investment points after the redemption of investment points for merchandise are not necessarily returned to the user. In this case, for example, even if points of 11500 pt are redeemed for a merchandise item corresponding to the range of "10000 to 11999 pt", the remaining points of 1500 pt (11500 pt–10000 pt) are not returned. In this system, 10000 points, 11000 points, 11500 points, and 11999 points are redeemed for the same merchandise item and erased, so it means that they have exactly the same value. Alternatively, if a fraction (e.g., 0.5 pt or 0.1 pt) smaller than the minimum investment point unit (e.g., 1 pt) occurs in the merchandise redemption processing, it can be rounded down.

Figure 19:
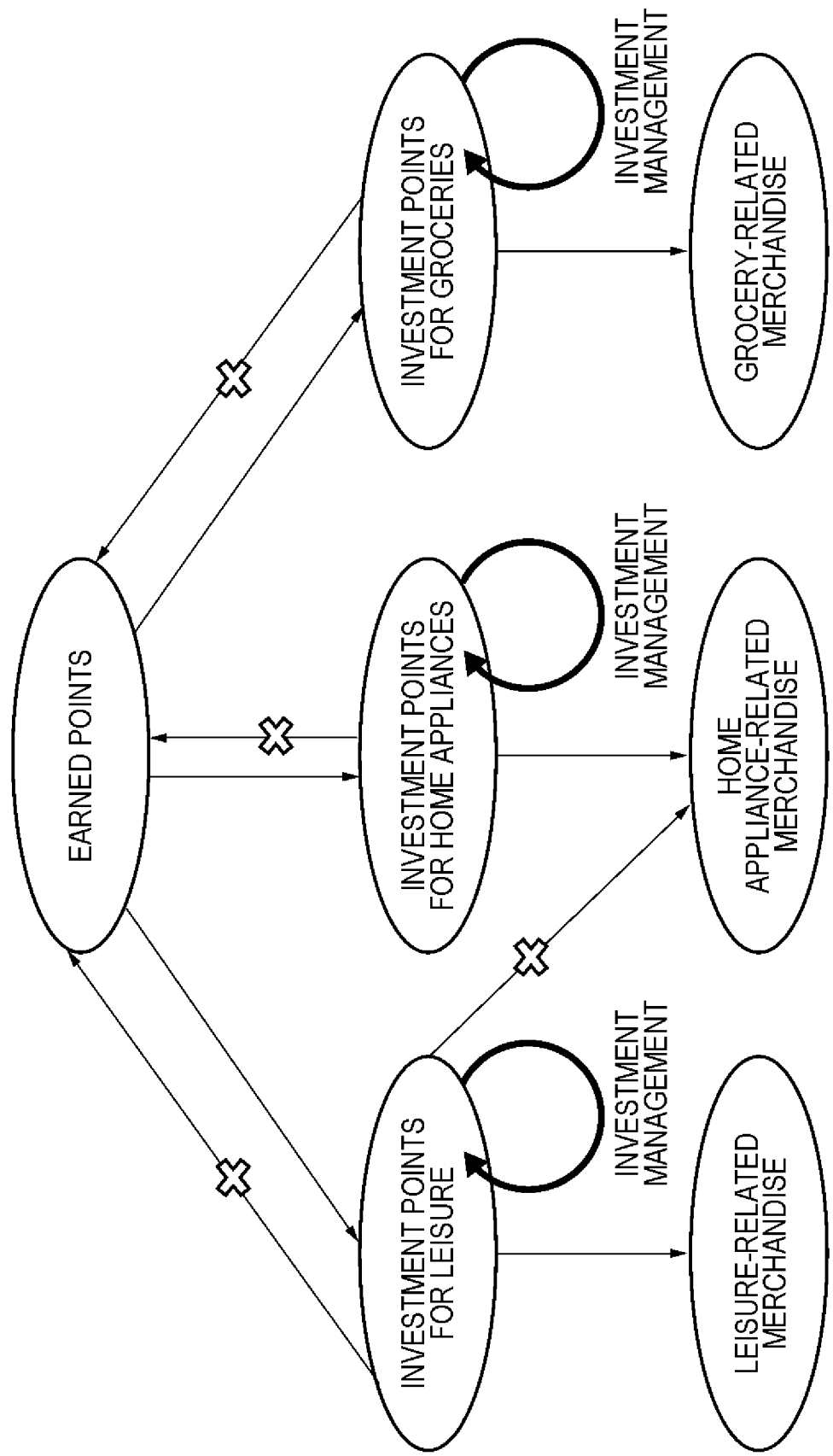
FIG. 19 is a schematic diagram illustrated to describe a scheme using multiple investment points according to the modification.

The description above in the embodiment is given the case where investment points can be redeemed for a particular type of merchandise, but the embodiment is not limited to this exemplary case. For example, a plurality of investment points can be provided for each usage or type of merchandise. FIG. 19 is a schematic diagram illustrated to describe a scheme using multiple investment points according to the modification. In this modification, the earned points can be irreversibly converted into three types of investment points: investment points for leisure, investment points for home appliances, and investment points for groceries. A point investment system according to the modification is configured to independently manage investment points for leisure, home appliances, and groceries. The investment points for leisure can be redeemed for leisure-related merchandise, the investment points for home appliances can be redeemed for home appliance-related merchandise, and the investment points for groceries can be redeemed for grocery-related merchandise. However, these points are not possible to be redeemed for merchandise of a category different from the corresponding category. The investment points for leisure, home appliances, and groceries are managed and redeemed for merchandise by a mechanism similar to the embodiment.

In the modification of FIG. 19, the earned points are converted into various investment points, the various types of investment points are increased by investment, and the various incremental investment points are redeemed for corresponding types of merchandise items. The relationship between earned points, investment points, and merchandise is not limited to this example. For example, the earned points can be converted into investment points, the investment points can be increased by investment, the incremental investment points can be reversely converted into earned points, and the earned points can be redeemed for merchandise. Alternatively, the earned points can be converted into investment points, the investment points can be increased by investment, and the incremental investment points and the earned points can be added up and redeemed for merchandise.

Figure 20:
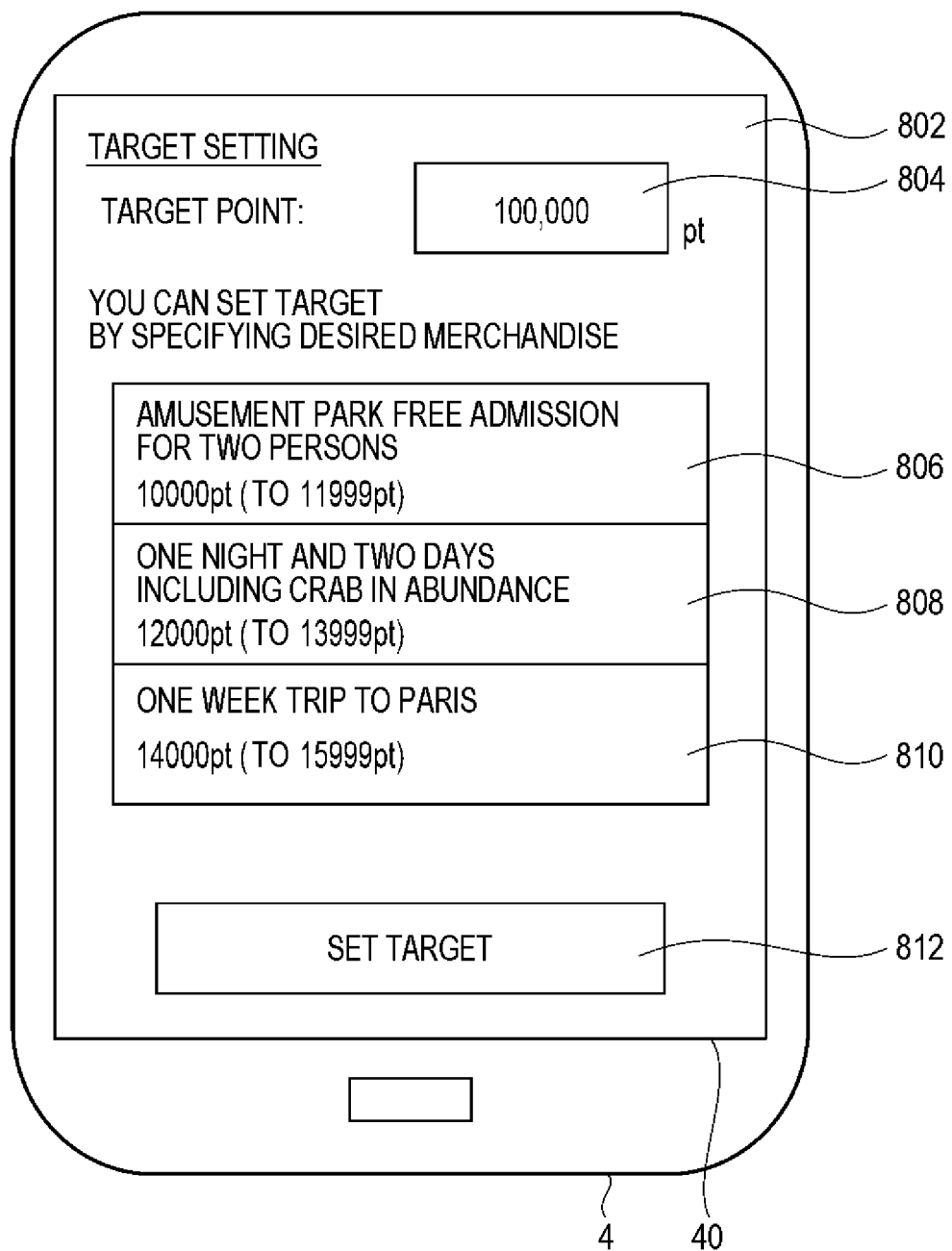
FIG. 20 is a diagram illustrating a typical target setting screen displayed on the display of the portable terminal.

The description above in the embodiment is given the case where the goal condition (take-profit condition, stop-loss condition) is set for each new order, that is, for each position via the new order receipt screen 504 of FIG. 12, but the embodiment is not limited to this exemplary case. In one example, a user is likely to invest in a plurality of currency pairs to obtain the desired merchandise. In this case, the user can set a target for the total value of investment points including the evaluation results of a plurality of different positions (invested currency pairs) possessed by the user. FIG. 20 is a diagram illustrating a typical screen of a target setting screen 802 displayed on the display 40 of the portable terminal 4. The target setting screen 802 has a target point entry region 804, merchandise objects 806, 808, and 810 representing merchandise items that can be specified, and a setting button 812. The user can specify the target number of investment points by entering a numerical value in the target point entry region 804. The user also can specify the lower limit of the point range corresponding to the merchandise tapped as the target number of investment points by tapping one of the merchandise objects 806, 808, and 810. Upon tapping the setting button 812, the portable terminal 4 acquires the specified number of investment points as the target number of points. The portable terminal 4 causes the display 40 to display a home screen 814 that includes the acquired target number of points.

Moreover, in the example of FIG. 20, if a merchandise object is specified, the corresponding number of investment points is automatically entered in the target point entry region 804. The target is therefore specified in points invested. On the other hand, in another example, the merchandise itself also can be set as a target. In the case where the range of investment points that can be redeemed for merchandise varies, if the merchandise itself is set as a target, it is advantageous because the take-profit condition and the stop-loss condition can be automatically changed depending on the variation.

Figure 21:
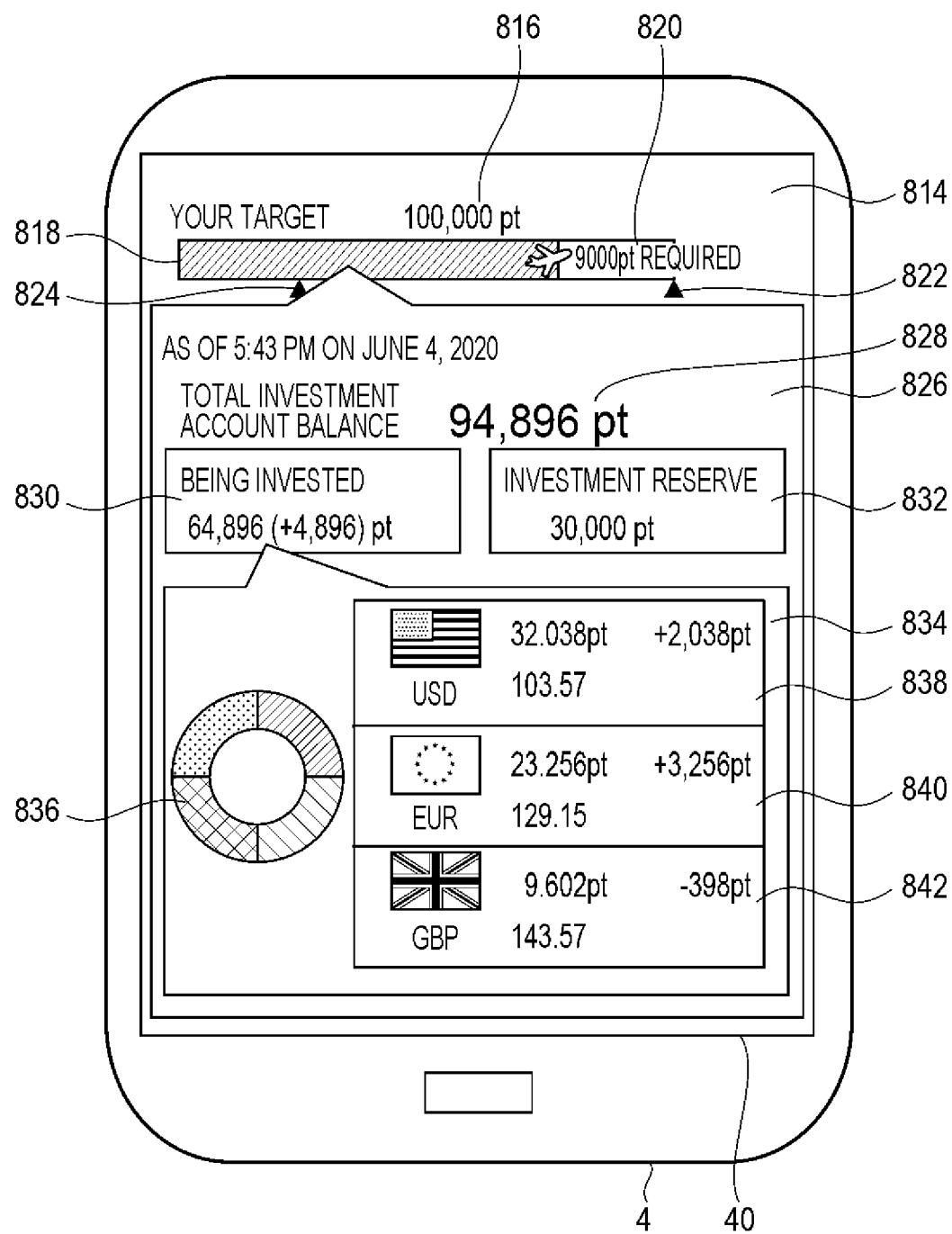
FIG. 21 is a diagram illustrating a typical home screen displayed on the display of the portable terminal.

FIG. 21 is a diagram illustrating a typical screen of the home screen 814 displayed on the display 40 of the portable terminal 4. The home screen 814 has a target display region 816, an achievement level displaying bar region 818, a required point number display region 820, a take-profit condition setting object 822, a stop-loss condition setting object 824, and a breakdown display region 826. The target display region 816 indicates the target number of points set on the target setting screen 802 in FIG. 20. The achievement level displaying bar region 818 indicates the degree of achievement of the target graphically. The point number display region 820 indicates the number of investment points required to achieve the target. The breakdown display region 826 indicates a breakdown of different positions the user possesses in relation to the target. The breakdown display region 826 has a total evaluation point display region 830, an investment reserve display region 832, a total investment point display region 828, position objects 838, 840, and 842, and a pie chart 836. The total evaluation point display region 830 indicates a total evaluation value (evaluation points) of multiple different positions the user possesses in relation to the target. The investment reserve display region 832 indicates the number of investment points being remained uninvested the user possesses in relation to the target. The total investment point display region 828 indicates the total investment points as a sum total of the number indicated in the total evaluation point display region 830 and the number indicated in the investment reserve display region 832. The position objects 838, 840, and 842 indicate multiple different positions the user possesses in relation to the target. The pie chart 836 indicates the composition ratio of each position. The position objects 838, 840, and 842 each indicate an image representing the position, the current evaluation value (evaluation points), the current rate, and the incremental/decremental value.

Figure 22:
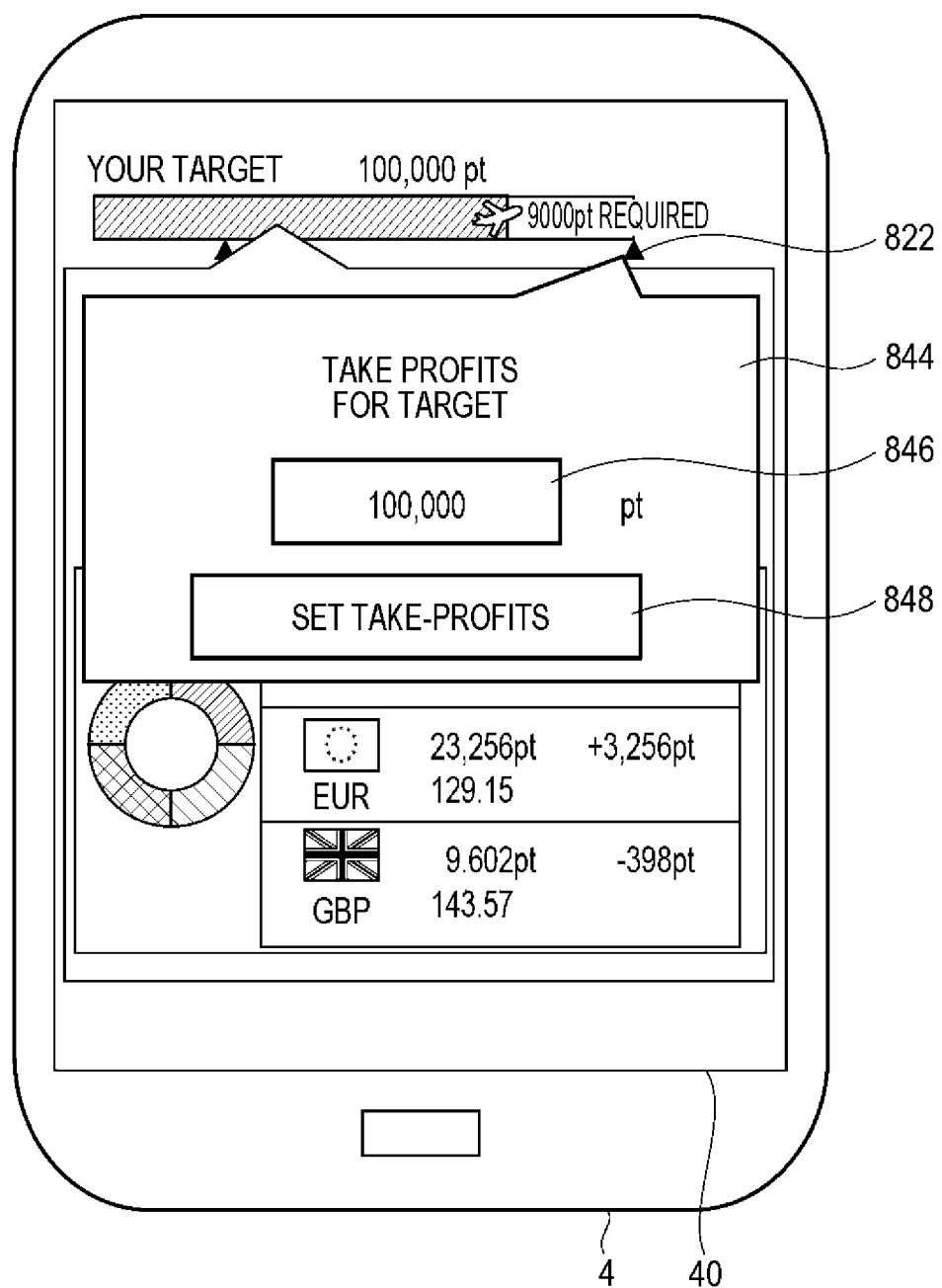
FIG. 22 is a diagram illustrating a typical home screen with a take-profit condition setting dialog displayed.

If the user taps the take-profit condition setting object 822, the portable terminal 4 receives the tap operation as a user instruction to set a target for take-profit and causes a take-profit condition setting dialog 844 to be displayed on the front of the home screen 814 in accordance with the received instruction. FIG. 22 is a diagram illustrating a typical screen of the home screen 814 with the take-profit condition setting dialog 844 displayed. The take-profit condition setting dialog 844 allows the user to specify the take-profit condition, which is the condition that the total investment points can need to satisfy to take profits. The take-profit condition setting dialog 844 has a take-profit point entry region 846 and a setting button 848. The user enters the number of take-profit points to take profits if the total investment points reach or exceed the intended value in the take-profit point entry region 846 and then taps the setting button 848. The portable terminal 4 incorporates the number of take-profit points set in the take-profit condition setting dialog 844 as a new target number of points in the target display region 816 and the achievement level displaying bar region 818 of the home screen 814. The investment server 10 acquires and holds the number of take-profit points set in the take-profit condition setting dialog 844 via the network 6, and if the user's total investment points reach or exceed the number of acquired take-profit points, then the user settles all the multiple different positions the user holds in relation to the target.

Figure 23:
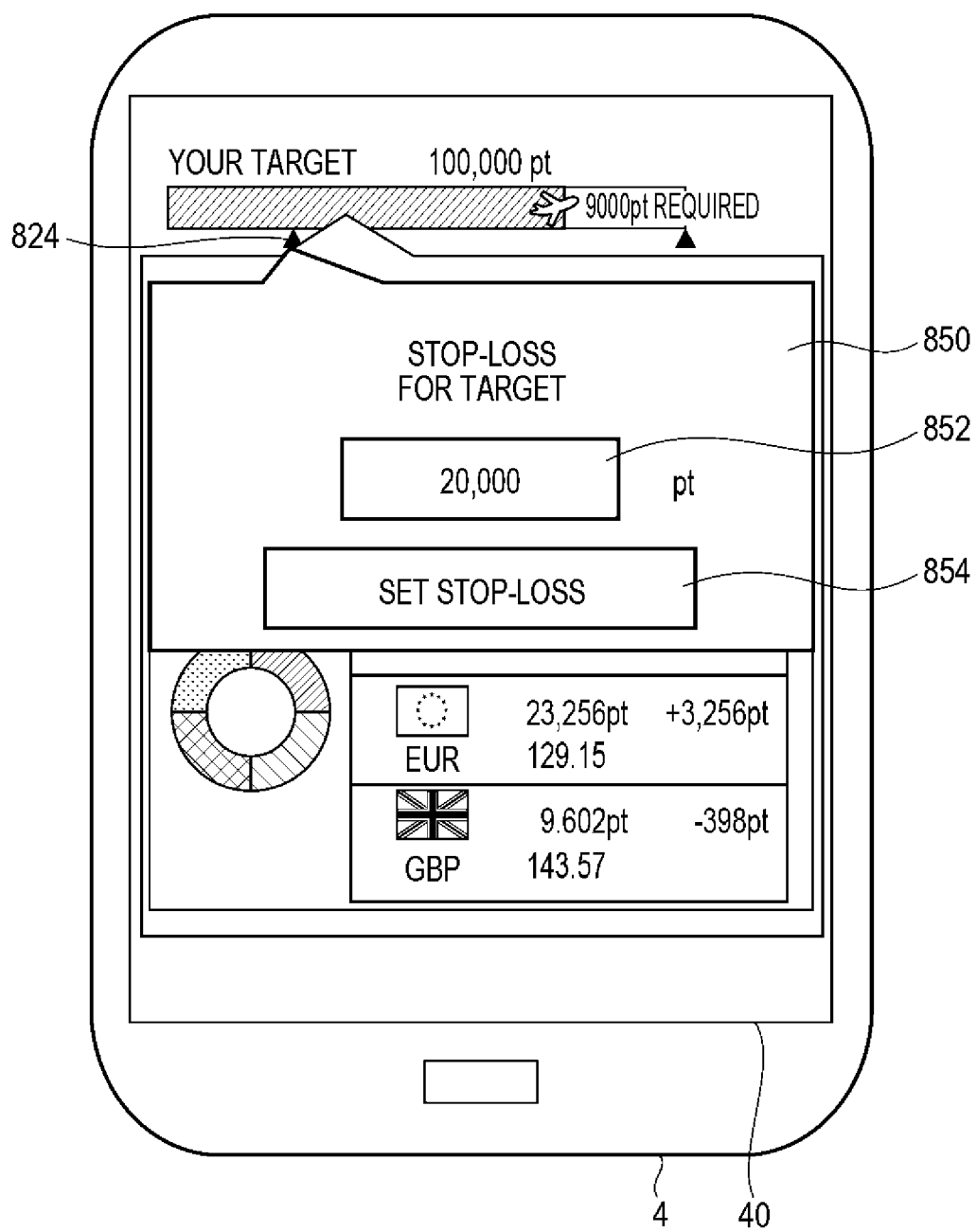
FIG. 23 is a diagram illustrating a typical home screen with a stop-loss condition setting dialog displayed.

If the user taps the stop-loss condition setting object 824 in the home screen 814 in FIG. 21, the portable terminal 4 receives the tap operation as a user instruction to set a target for stop-loss and causes a stop-loss condition setting dialog 850 to be displayed on the front of the home screen 814 in accordance with the received instruction. FIG. 23 is a diagram illustrating a typical screen of the home screen 814 with the stop-loss condition setting dialog 850 displayed. The stop-loss condition setting dialog 850 allows the user to specify the stop-loss condition, which is the condition that the total investment points can need to satisfy to stop loss. The stop-loss condition setting dialog 850 has a stop-loss point entry region 852 and a setting button 854. The user enters the number of stop-loss points to stop loss if the total investment points reach or fall below the intended value in the stop-loss point entry region 852 and then taps the setting button 854. The investment server 10 acquires and holds the number of stop-loss points set in the stop-loss condition setting dialog 850 via the network 6, and if the user's total investment points reach or fall below the number of acquired stop-loss points, then the user settles all the multiple different positions the user holds in relation to the target.

In the modifications illustrated in FIGS. 20 to 23, each of the multiple different positions held by the user in relation to the target can have separate take profit and/or stop-loss conditions. In this case, the settlement can be made at the timing when one of the take-profit condition, the stop-loss condition, and the take-profit or stop-loss condition for individual positions is satisfied for the total investment points. Alternatively, the take-profit or stop-loss condition for individual positions can be designed to be ignored in the case where the take-profit or stop-loss condition for the total investment points is set.

The description in the new order receipt screen 504 of FIG. 12 is given the case where the take-profit and stop-loss conditions are specified by the incremental number of points and the decremental number of points, respectively. On the other hand, in the modifications illustrated in FIGS. 20 to 23, both the take-profit and stop-loss conditions are specified by the total number of points. This configuration makes it possible for the user to directly compare the number of points to be set as the target with the number of points required for the desired merchandise, which makes it easy to understand, thus improving the user's convenience in setting the target. Moreover, in the modifications illustrated in FIGS. 20 to 23, the take-profit condition and stop-loss conditions can be specified by the incremental number of points and the decremental number of points, respectively, similar to the example in FIG. 12.

Figure 24:
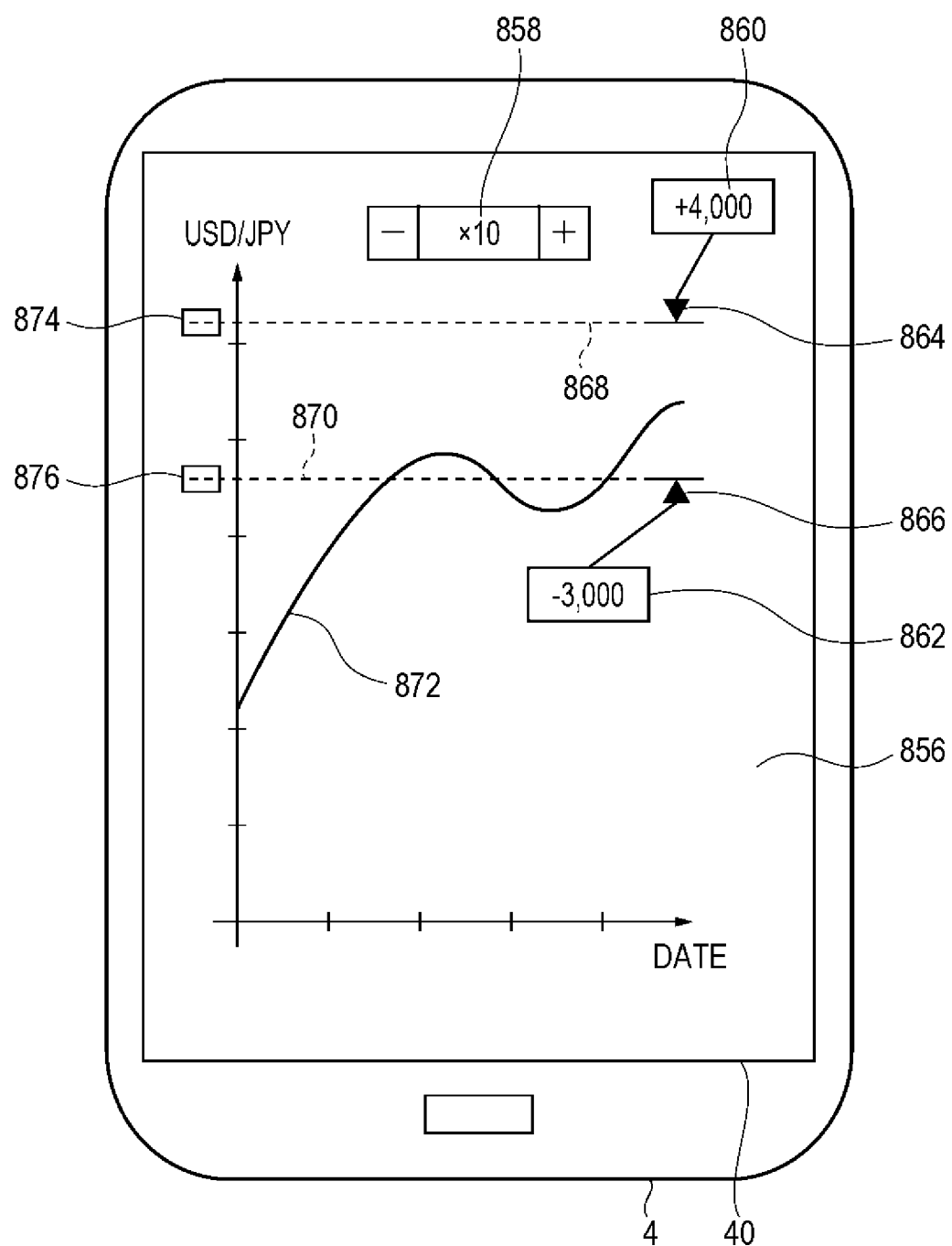
FIG. 24 is a diagram illustrating a typical graphical new order receipt screen displayed on the display of the portable terminal.

The description above in the embodiment is given the case where various parameters related to a new order are received from the user using the new order receipt screen 504 of FIG. 12, but the embodiment is not limited to this exemplary case. For example, parameters for a new order can be entered or specified directly on a chart showing price fluctuations. FIG. 24 is a diagram illustrating a typical screen of the graphical new order receipt screen 856 displayed on the display 40 of the portable terminal 4. In one example, an object serving as a flow line to the graphical new order receipt screen 856 can be provided on the new order receipt screen 504 of FIG. 12, and upon tapping the object, the graphical new order receipt screen 856 can be displayed. The graphical new order receipt screen 856 has a chart 872, an investment rate entry region 858, an incremental number entry region 860, a decremental number entry region 862, a take-profit condition change object 864, a stop-loss condition change object 866, a take-profit line 868, a stop-loss line 870, a take-profit rate 874, and a stop-loss rate 876. The chart 872 indicates price fluctuations of the selected currency pair. The investment rate entry region 858 receives the entry of an investment ratio. The incremental number entry region 860 receives the entry of the incremental number of investment points regarding the take-profit condition. The decremental number entry region 862 receives the entry of the decremental number of investment points regarding the stop-loss condition. The chart 872 can be plotted daily, minute, second, weekly, monthly, yearly, and the like.

The user enters or selects the desired investment ratio in the investment ratio entry region 858, enters the desired incremental number of points in the incremental number entry region 860, and enters the decremental number of points regarding the stop-loss in the decremental number entry region 862, which are performed while referring to the chart 872. The take-profit rate is calculated from the number of investment points to be invested (specified in the point number entry region 568 in FIG. 12), the ratio entered in the investment ratio entry region 858, and the incremental number of points entered in the incremental number entry region 860. The take-profit rate 874 and the take-profit line 868 corresponding to the calculated rate are displayed. The stop-loss rate is calculated from the number of investment points to be invested (specified in the point number entry region 568 in FIG. 12), the ratio entered in the investment ratio entry region 858, and the decremental number of points entered in the decremental number entry region 862. The stop-loss rate 876 and the stop-loss line 870 corresponding to the calculated rate are displayed.

If the user intends to change the take-profit rate, the user can drag the take-profit condition change object 864 to shift it up or down by the desired distance. The portable terminal 4 recalculates the incremental number of points upon taking profits at the rate corresponding to the position of the take-profit condition change object 864 after such shift and updates the display of the incremental number entry region 860 on the basis of the calculation result.

If the user intends to change the stop-loss rate, the user can drag the stop-loss condition change object 866 to shift it up or down by the desired distance. The portable terminal 4 recalculates the decremental number of points upon stopping loss at the rate corresponding to the position of the stop-loss condition change object 866 after such shift and updates the display of the decremental number entry region 862 on the basis of the calculation result.

Figure 25:
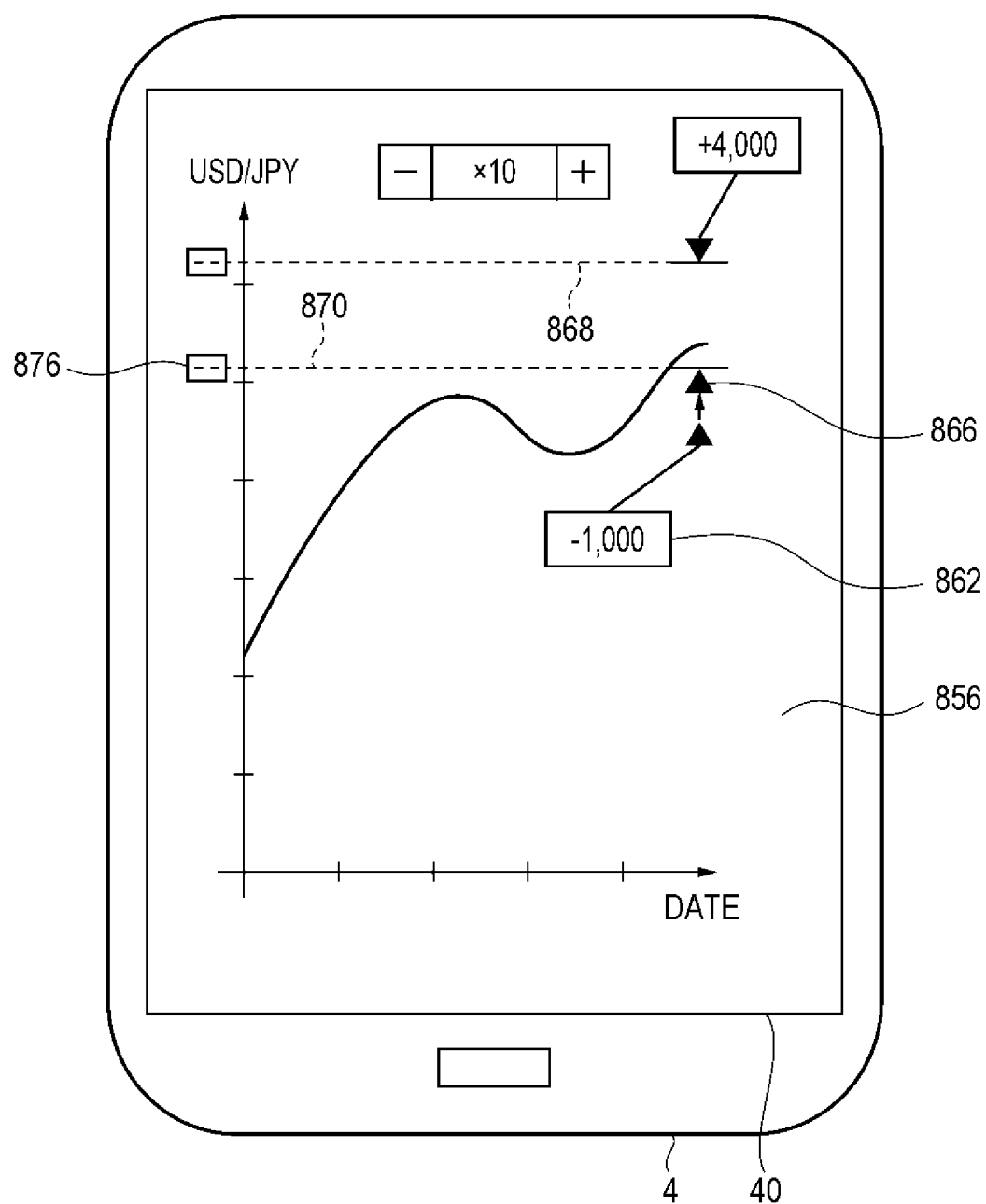
FIG. 25 is a diagram illustrating a typical graphical new order receipt screen with the stop-loss condition change object dragging upward by a predetermined distance.

FIG. 25 is a diagram illustrating a typical screen of the graphical new order receipt screen 856 with the stop-loss condition change object 866 dragging upward by a predetermined distance. The decremental number of points is recalculated depending on the change in the stop-loss rate, and the recalculation result is incorporated in the decremental number entry region 862. Specifically, shifting the stop-loss rate upward from the state of FIG. 24 results in the update in the decremental number of points upon the stop-loss from "−3000" to "−1000".

If the user intends to change the investment rate, the user enters or selects the desired ratio in the investment ratio entry region 858. The portable terminal 4 recalculates the take-profit rate from the changed ratio, the number of investment points to be invested, and the incremental number of points entered in the incremental number entry region 860. The portable terminal 4 updates the indications of the take-profit rate 874 and the take-profit line 868 at the rate obtained by the recalculation. The portable terminal 4 recalculates the stop-loss rate from the changed ratio, the number of investment points to be invested, and the decremental number of points entered in the decremental number entry region 862. The portable terminal 4 updates the indications of the stop-loss rate 876 and the stop-loss line 870 at the rate obtained by the recalculation.

FIG. 26 is a diagram illustrating a typical screen of the graphical new order receipt screen 856 with a ratio being changed. The take-profit and stop-loss rates are recalculated depending on the change in the ratio. The recalculation result updates the display of the take-profit line 868, the take-profit rate 874, the stop-loss line 870, and the stop-loss rate 876. Specifically, changing the ratio from 'x10' to 'x20' in FIG. 24 results in a decrease in the take-profit rate and an increase in the stop-less rate for the same incremental number of points and decremental number of points. The gap between the take-profit line 868 and the stop-loss line 870 in the state in FIG. 26 is narrower than in FIG. 24.

The contents of the technical issues of this system are paraphrased below. In cases of a system in which there are foreign currency fluctuations or the number of points only once per day or several days and of a system that processes at shorter intervals, the latter has a higher system load. In addition, in a system that processes at shorter intervals, the end-user is able to check the price fluctuations (changes in the incremental and decremental number of points) of the user's profit and loss in substantially real-time, so this system has more access times than the former system, and the latter system only increases the load.

It is desirable to have sufficient server-side capacity to cope with such system loads adequately, but increasing the server infrastructure is required, incurring considerable costs. In addition, the maximum capacity is designed assuming that a target end-user will access it temporarily and intensively, so even the normal maximum capacity is typically designed with a reasonable margin, still necessitating the over-estimation of the maximum capacity.

In particular, receiving an application for redemption of goods from the end-user at a particular timing and processing it on the server side, while displaying changes in the number of points to the end-user at high speed, require a large throughput and high processing speed.

The technical solution using the system according the embodiment to such issues is described above, and furthermore, its overview and additional contents are now described. In one example, as illustrated in FIG. 20, the embodiment has the configuration in which the end-user is allowed to specify merchandise with a range by setting a target, and if the number of points reaches the target number of points required for the merchandise redemption, automatic redemption of points for merchandise is performed. This configuration eliminates the need for the end-user to constantly monitor fluctuations of foreign currencies, which leads to a reduction in the number of accesses, making a large capacity estimate for processing on the server side unnecessary. In addition, it is possible for the system to have a configuration for checking that the target number of points are reached at a particular timing can eliminate the need to perform the merchandise redemption processing at high speed and for performing the delayed merchandise redemption processing when the throughput is low, such as when the number of accesses from the end-user is below a certain level. It is also possible for the system to have a further configuration in which only a part of the merchandise redemption processing is executed immediately after reaching the target number of points, and the execution of the remaining part is performed when the throughput is low as described above. For example, a part of the merchandise redemption processing can be a notification of arrival to the target number of points to the end-user. In this case, as long as the notification includes a purport that the specific procedure for the merchandise redemption processing will be notified later, there will be no problem even if a slight delay occurs in the merchandise redemption processing. In addition, if there is an end-user who wants to urgently request the merchandise redemption, an API request for promptly executing only the urgent merchandise redemption can also be written as a URL in the notification, and upon accessing this URL, the server can perform only tasks in the urgent merchandise redemption immediately. Moreover, the URL is required to include a number that identifies the target case.

Further, it is desirable to perform point calculation and merchandise redemption confirmation processing shorter than the price fluctuation interval of foreign currencies. In particular, if the end-user checks the user's points in real-time and confirms whether or not the target number of points has been reached, it is desirable to perform such processing (in short, the target user is accessing the target system). In one example, if the price fluctuation interval of foreign currency is 10 seconds, the value of a foreign currency is determined at a particular timing, points are calculated on the basis of the determined value, and it is determined whether the number of points has reached the target number of points. It is desired that the display indicating that the target number of points has been reached and the merchandise redemption has been confirmed for the end-user who is accessing is configured to be performed within 10 seconds of the interval from this particular timing. Otherwise, from the perspective of the accessing end-user, it would appear that the merchandise processing has not been performed even though the target number of points has been reached. Moreover, as a supplement, it is normal for the actual price fluctuations of foreign currencies to occur within one second, but the system according to the embodiment employs the exemplary configuration in which the fluctuations in foreign currencies occur at intervals of 10 seconds after thinning.

The present application claims priority based on Japanese Patent Application No. 2020-112774 filed on Jun. 30, 2020, the entire contents of which are incorporated herein by reference.

The invention claimed is:

1. A server comprising:
one or more processors; and
a memory storing instructions which, when the instructions are executed by the one or more processors, cause the server to:
receive a request for conversion from a first electronic value into a second electronic value from a user's terminal via a network;
display a new order receipt screen on a display of the user's terminal via the network;
receive an investment instruction to invest in the second electronic value obtained by the conversion from the user's terminal via the network;
hold information in a storage regarding a type of merchandise corresponding to the second electronic value and a range of the second electronic value in association with each other;
receive a redemption instruction to redeem the second electronic value for the merchandise from the user's terminal via the network, the second electronic value being increased or decreased by the investment; and
refer to the storage and perform merchandise redemption processing on a basis of the received redemption instruction,
wherein the new order receipt screen is configured to allow a user to specify an amount of the second electronic value to be traded and an incremental amount of the second electronic value for take-profit, and to display an amount of the second electronic value when taking profit is achieved according to an incremental amount of the second electronic value for take-profit,
the redemption instruction includes a selection of the merchandise to be redeemed,
the instructions further cause the server to automatically perform only a part of the merchandise redemption processing immediately after the amount of the second electronic value reaches the amount of the second electronic value associated with the selected merchandise, and automatically perform a remaining part of the merchandise redemption processing when a number of accesses from users is below a certain level, the part of the merchandise redemption processing being a notification of arrival of the second electronic value to the amount of the second electronic value associated with the selected merchandise to the user, the remaining part of the merchandise redemption processing including a processing to redeem the second electronic value for the merchandise,
the notification includes URL which allows the user to make an API request for promptly executing the merchandise redemption processing, and
the instructions further cause the server to perform the merchandise redemption processing upon the URL is accessed.

2. The server according to claim 1, wherein
the investment instruction includes information used to set a stop, and
the instructions further cause the server to
execute a trade at the set stop if a stop-loss execution condition is met.

3. The server according to claim 1, wherein the instructions further cause the server to:
display a market order settlement receipt screen including a trading rate on a display of the user's terminal via the network; and
execute the trade at a rate indicated on the market order settlement receipt screen upon receiving an instruction to perform a market order settlement via the market order settlement receipt screen.

4. The server according to claim 1, wherein
the investment instruction is an instruction relating to a new order including an amount of the second electronic value to be traded, an incremental amount of the second electronic value regarding take-profit, and a decremental amount of the second electronic value regarding stop-loss, and
the instructions further cause the server to:
execute the new order at an actual rate at a timing likely to differ from the rate displayed on the new order receipt screen upon receiving the instruction relating to the new order via the new order receipt screen;
set a limit for the new order on a basis of an executed amount of a trading target, the incremental amount of the second electronic value regarding take-profit, and the actual rate; and
set a stop-loss for the new order on a basis of the executed amount of the trading target, the decremental amount of the second electronic value regarding stop-loss, and the actual rate.

5. The server according to claim 1, wherein the merchandise redemption processing is prevented from returning a fraction of the second electronic value obtained after redemption of the second electronic value for the merchandise to a user.

6. The server according to claim 1, wherein the new order receipt screen includes:
a point number entry region configured to receive, from the user, an entry of the amount of the second electronic value to be traded;
an incremental number entry region configured to receive, from the user, an entry of the amount of the second electronic value for take-profit; and
an expectation total point number display region configured to display, on the display of the user's terminal, the amount of the second electronic value when taking profit is achieved according to the incremental amount of the second electronic value for take-profit.

* * * * *